US012484970B2

(12) United States Patent
Van Der Zaag et al.

(10) Patent No.: US 12,484,970 B2
(45) Date of Patent: Dec. 2, 2025

(54) EXTRALUMINAL IMAGING BASED INTRALUMINAL THERAPY GUIDANCE SYSTEMS, DEVICES, AND METHODS

(71) Applicant: PHILIPS IMAGE GUIDED THERAPY CORPORATION, San Diego, CA (US)

(72) Inventors: Pieter J. Van Der Zaag, Waalre (NL); John Arthur Pedersen, Eden Prairie, MN (US)

(73) Assignee: PHILIPS IMAGE GUIDED THERAPY CORPORATION, San Diego, CA (US)

( * ) Notice: Subject to any disclaimer, the term of this patent is extended or adjusted under 35 U.S.C. 154(b) by 306 days.

(21) Appl. No.: 18/031,021

(22) PCT Filed: Sep. 28, 2021

(86) PCT No.: PCT/EP2021/076556
§ 371 (c)(1),
(2) Date: Apr. 10, 2023

(87) PCT Pub. No.: WO2022/078744
PCT Pub. Date: Apr. 21, 2022

(65) Prior Publication Data
US 2023/0372025 A1 Nov. 23, 2023

Related U.S. Application Data

(60) Provisional application No. 63/090,638, filed on Oct. 12, 2020.

(51) Int. Cl.
A61B 34/20 (2016.01)
A61B 6/00 (2024.01)
(Continued)

(52) U.S. Cl.
CPC .............. *A61B 34/20* (2016.02); *A61B 6/463* (2013.01); *A61B 6/487* (2013.01); *A61B 6/504* (2013.01); *A61B 2034/2063* (2016.02)

(58) Field of Classification Search
CPC ......... A61B 34/20; A61B 6/463; A61B 6/487; A61B 6/504; A61B 2034/2063;
(Continued)

(56) References Cited

U.S. PATENT DOCUMENTS 7,778,685 B2    8/2010   Evron
10,660,769 B2 *  5/2020   Keller .................... G16H 30/40
(Continued)

FOREIGN PATENT DOCUMENTS

EP    2852319 B1    5/2017

OTHER PUBLICATIONS

International Search Report and Written Opinion of PCT/P2021/076556 dated Jan. 4, 2022.
(Continued)

*Primary Examiner* — Baisakhi Roy

(57) ABSTRACT

An intravascular therapy guidance system includes a processor circuit in communication with an extravascular imaging device. The processor circuit receives, from the extravascular imaging device, an extravascular image stream. The processor circuit determines a therapy region of a blood vessel in the extravascular image stream and outputs a screen display to a display in communication with processor circuit. The screen display includes the extravascular image stream of the blood vessel including movement of an intravascular therapy device within the blood vessel to deliver an intravascular therapy to the therapy region and a graphical representation of the therapy region overlaid on the extravascular image stream. The processor circuit determines, based on the extravascular image stream, whether the
(Continued)

intravascular therapy device is aligned relative to the therapy region to deliver the intravascular therapy and modifies the screen display to indicate whether the intravascular therapy device is aligned to deliver the intravascular therapy.

19 Claims, 17 Drawing Sheets

(51) Int. Cl.
*A61B 6/46* (2024.01)
*A61B 6/50* (2024.01)

(58) Field of Classification Search
CPC ... A61B 6/5247; A61B 8/0841; A61B 8/0891; A61B 8/12; A61B 8/4416; A61B 8/5207; A61B 8/085

See application file for complete search history.

(56) References Cited

U.S. PATENT DOCUMENTS

| | | |
|---|---|---|
| 2005/0222596 A1 | 10/2005 | Maschke |
| 2009/0177090 A1 | 7/2009 | Grunwald |
| 2012/0029339 A1 | 2/2012 | Cohen |
| 2014/0180072 A1* | 6/2014 | Davies ............... A61B 6/12 600/424 |
| 2014/0277389 A1 | 9/2014 | Braido |
| 2017/0079554 A1* | 3/2017 | Glossop ............... A61B 8/4245 |
| 2018/0085170 A1 | 3/2018 | Gopinath |
| 2019/0015056 A1* | 1/2019 | Sato ..................... A61B 6/12 |
| 2019/0046156 A1* | 2/2019 | De Cicco ............. A61B 6/12 |
| 2019/0282182 A1 | 9/2019 | Scott |
| 2019/0282211 A1 | 9/2019 | Merritt |
| 2020/0029932 A1 | 1/2020 | Cohen |
| 2020/0085386 A1 | 3/2020 | Klaiman |
| 2021/0259780 A1 | 8/2021 | Van Der Zaag |
| 2023/0045488 A1 | 2/2023 | Rajguru |
| 2023/0051383 A1 | 2/2023 | Rajguru |

OTHER PUBLICATIONS

Takayama, Toshio et al "Directional Tip Control Technique for Optimal Stent Graft Alignment in Angulated Proximal Aortic Landing Zones", Journal of Vascular Surgery Cases and Innovative Techniques, Jun. 2017.

Sun, Zheng et al "An Interactive Virtual Intracoronary Stenting System Based on Intravascular Ultrasound", Journal of Mechanics in Medicine and Biology, vol. 17, No. 7, 2017.

Antonello, Michele et al "Gore Tag Thoracis Endograft with Active Control System: Landing Accuracy and Wall Apposition in an Initial Clinical Experience", Annals of Vacsular Surgery, 2019.

Mahtta, Dhruv et al "Intravascular Ultrasound for Guidance and Optimization of Percutaneous Coronary Intervention", Interventional Cardiology Clin, vol. 7, 2018.

* cited by examiner

EXTRALUMINAL IMAGING BASED INTRALUMINAL THERAPY GUIDANCE SYSTEMS, DEVICES, AND METHODS

TECHNICAL FIELD

The present disclosure relates generally to providing guidance during intraluminal therapy, such as intravascular therapy. For example, a screen display including an x-ray image stream of a patient's blood vessel may be modified to indicate a position of an intravascular therapy device relative to a therapy region of the blood vessel so that an intended therapy may be delivered more accurately to the therapy region.

BACKGROUND

Treatment of cardiovascular disease may involve intravascular therapy at the site of a lesion in a blood vessel, which may restore flow within the blood vessel and prevent downstream tissue ischemia. Examples of such intravascular therapy include the placement of a stent and/or the deployment of a balloon (e.g., balloon angioplasty) at the site of the lesion to reopen the blood vessel. Further, in some instances, atherectomy or thrombectomy may be used to remove occlusive material from the blood vessel at the site of the lesion. In any case, the intravascular therapy may be applied to a therapy region defined between a healthy point proximal to the site of the lesion and a healthy point distal to the site of the lesion. Accordingly, the intravascular therapy may be applied from healthy-to-healthy tissue within the blood vessel, which may ensure that the whole lesion is affected by the treatment and may provide optimal treatment results.

To determine the location the intravascular therapy will be applied in the blood vessel, a physician may use x-ray imaging to determine the position of an intravascular device configured to deliver the therapy. For example, based on a fluoroscopic image and a radiopaque portion of the intravascular device, the physician may approximate the location the intravascular therapy will be delivered in the blood vessel. However, because the blood vessel and the site of the lesion may not be visible in the x-ray image (due to the absence of contrast agent during fluoroscopic imaging), targeting intravascular therapy to the therapy region may be inaccurate. Moreover, if the intravascular therapy is applied outside the therapy region, the entire lesion may not be properly treated, which may result in future risk to the patient. For example, if a stent or a balloon is deployed outside the therapy region (e.g., misaligned relative to the therapy region), the blood vessel may not be reopened sufficiently. In the case of atherectomy or thrombectomy, applying the intravascular therapy outside the therapy region may leave occlusive material within an untreated portion of the therapy region. Further, deploying atherectomy or thrombectomy outside the therapy region may affect healthy tissue that is not the target of therapy.

SUMMARY

Embodiments of the present disclosure provide guidance to physicians to deliver therapy to body lumen of a patient. An example of such intraluminal therapy is intravascular therapy to treat the patient's blood vessel. Types of intravascular therapy include deployment of a stent and/or balloon, atherectomy, thrombectomy, and/or the like. For example, a graphical representation of a region of a patient's blood vessel identified as a therapy region may be overlaid upon an x-ray image stream (e.g., an extraluminal image stream) of the patient's blood vessel. This therapy region can be visually distinguished in the x-ray image stream. This is advantageous especially when the x-ray image stream is obtained without contrast agent inside the vessel. Without contrast agent, the vessel itself and/or a blood flow restriction of the vessel is not directly visible in the x-ray image stream. The therapy region provides a directly visible indication in the x-ray image stream obtained without contrast agent. As an intravascular device is navigated through the patient's blood vessel to deliver intravascular therapy to the therapy region, the position of the intravascular device relative to the therapy region may be determined based on the x-ray stream. Moreover, the x-ray stream and the position of the intravascular therapy device may be used to determine whether the intravascular device is positioned to deliver therapy to the therapy region (e.g., whether the intravascular device is within or aligned with the therapy region). Based on this determination, a screen display including the x-ray stream and graphical representation of the therapy region may be modified to indicate whether the intravascular therapy device is positioned to deliver the intravascular therapy. For example, the screen display may be modified to indicate whether a tip of the intravascular therapy device is positioned within the therapy region, whether each end of the intravascular therapy device (e.g., a distal and a proximal end) is aligned with the ends of the therapy region, a length of the therapy device, and/or a duration the therapy device is active within the therapy region. The systems, devices, and methods described herein advantageously provide a physician a clear indication of the location of the targeted therapy region, which may reduce the incidence of intravascular therapies delivered outside of the therapy region. Accordingly, an intravascular therapy delivered according to the techniques described herein may provide optimal treatment results to a therapy region of a blood vessel.

In some aspects, an intravascular therapy guidance system includes a processor circuit in communication with an extravascular imaging device. The processor circuit is configured to receive, from the extravascular imaging device, an extravascular image stream. The processor circuit can be further configured to determine a therapy region of a blood vessel in the extravascular image stream and to output a screen display to a display in communication with processor circuit. The screen display can include the extravascular image stream of the blood vessel including movement of an intravascular therapy device within the blood vessel to deliver an intravascular therapy to the therapy region. The screen display can further include a graphical representation of the therapy region overlaid on the extravascular image stream. The processor circuit can further be configured to determine, based on the extravascular image stream, whether the intravascular therapy device is aligned relative to the therapy region to deliver the intravascular therapy and to modify the screen display to indicate the determination of whether the intravascular therapy device is aligned to deliver the intravascular therapy.

In some aspects, the processor circuit is configured to provide a first modification of the screen display in response to determining that the intravascular therapy device is aligned to deliver the intravascular therapy. The processor circuit can be further configured to provide a second modification of the screen display in response to determining that the intravascular therapy device is not aligned to deliver the intravascular therapy. In some aspects, the processor circuit is configured to provide a first visual appearance for the graphical representation of the therapy region in response to determining that the intravascular therapy device is aligned to deliver the intravascular therapy. The processor circuit can be further configured to provide a second visual appearance for the graphical representation of the therapy region in response to determining that the intravascular therapy device is not aligned to deliver the intravascular therapy. In some aspects, the processor circuit is configured to provide a first indicator in the screen display in response to determining that the intravascular therapy device is aligned to deliver the intravascular therapy. The processor circuit may be further configured to provide a second indicator in the screen display in response to determining that the intravascular therapy device is not aligned to deliver the intravascular therapy.

In some aspects, to determine whether the intravascular therapy device is aligned to deliver the intravascular therapy, the processor circuit is configured to determine if the intravascular therapy device is within a threshold distance of the therapy region. In some aspects, to determine the therapy region of the blood vessel, the processor circuit is configured to receive a user input designating a proximal landing zone for the intravascular therapy device and receive a user input designating a distal landing zone for the intravascular therapy device. The processor circuit can be further configured to determine if a proximal portion of the intravascular therapy device is aligned with the proximal landing zone and to determine if a distal portion of the intravascular therapy device is aligned with the distal landing zone. In some aspects, the processor circuit is configured to determine whether a length of the intravascular therapy device extends a distance between the proximal landing zone and the distal landing zone and to modify the screen display to indicate the determination of whether the length of the intravascular therapy device extends the distance. In some aspects, the processor circuit is configured to determine the length of the intravascular therapy device, determine the distance between the proximal landing zone and the distal landing zone, and provide a graphical representation of the length and the distance in the screen display. In some aspects, the processor circuit is configured to determine a length of the therapy region, and the screen display further includes a graphical representation of the length of the therapy region.

In some aspects, the processor circuit is configured to determine, based on the extravascular image stream, an amount of time that the intravascular therapy device delivers the intravascular therapy to the therapy region, compare the amount of time to a threshold, and provide a graphical representation of the comparison in the screen display. In some aspects, the processor circuit is configured to provide a graphical representation of a first state or a second state of the intravascular therapy device in the screen display based on the determination of whether the intravascular therapy device is aligned to deliver the intravascular therapy. In the first state, the intravascular therapy device can be operable to deliver the intravascular therapy, and, in the second state, the intravascular therapy device may not be operable to deliver the intravascular therapy. The processor circuit can be configured to provide the graphical representation of the first state of the intravascular therapy device in response to determining that the intravascular therapy device is aligned to deliver the intravascular therapy. The processor circuit can further be configured to provide the graphical representation of the second state of the intravascular therapy device in response to determining that the intravascular therapy device is not aligned to deliver the intravascular therapy.

In some aspects, to receive the extravascular image stream, the processor circuit is configured to receive a fluoroscopic image stream obtained without a contrast material inside the blood vessel. The processor circuit can be further configured to determine the therapy region based on an angiographic image obtained with the contrast material inside the blood vessel. In some aspects, to determine the therapy region, the processor circuit is configured to receive a user input designating the therapy region. In some aspects, the processor circuit is configured to determine the therapy region based on intravascular ultrasound (IVUS) images of the blood vessel. In some aspects, the intravascular therapy guidance system further includes the intravascular therapy device.

In some aspects, an intravascular therapy guidance system, includes a processor circuit in communication with an x-ray imaging device. The processor circuit is configured to receive, from the x-ray imaging device, an x-ray fluoroscopy image stream obtained without a contrast material inside a blood vessel. The processor circuit can be further configured to receive a user input designating an intravascular therapy region on the x-ray fluoroscopy image stream. Further, the processor circuit can be configured to output a screen display to a display in communication with processor circuit. The screen display can include the x-ray fluoroscopy image stream including movement of an intravascular therapy device within the blood vessel to deliver an intravascular therapy to the intravascular therapy region. The intravascular therapy device can include at least one of a stent, a balloon, a thrombectomy device, or an atherectomy device. The screen display can further include a graphical representation of the intravascular therapy region overlaid on the x-ray fluoroscopy image stream. The processor circuit can further be configured to determine, based the x-ray fluoroscopy image stream, that the intravascular therapy device is aligned with the intravascular therapy region and to modify the screen display to indicate alignment of the intravascular therapy device with the intravascular therapy region.

Additional aspects, features, and advantages of the present disclosure will become apparent from the following detailed description.

BRIEF DESCRIPTION OF THE DRAWINGS

Illustrative embodiments of the present disclosure will be described with reference to the accompanying drawings, of which.

DETAILED DESCRIPTION

Figure 1:
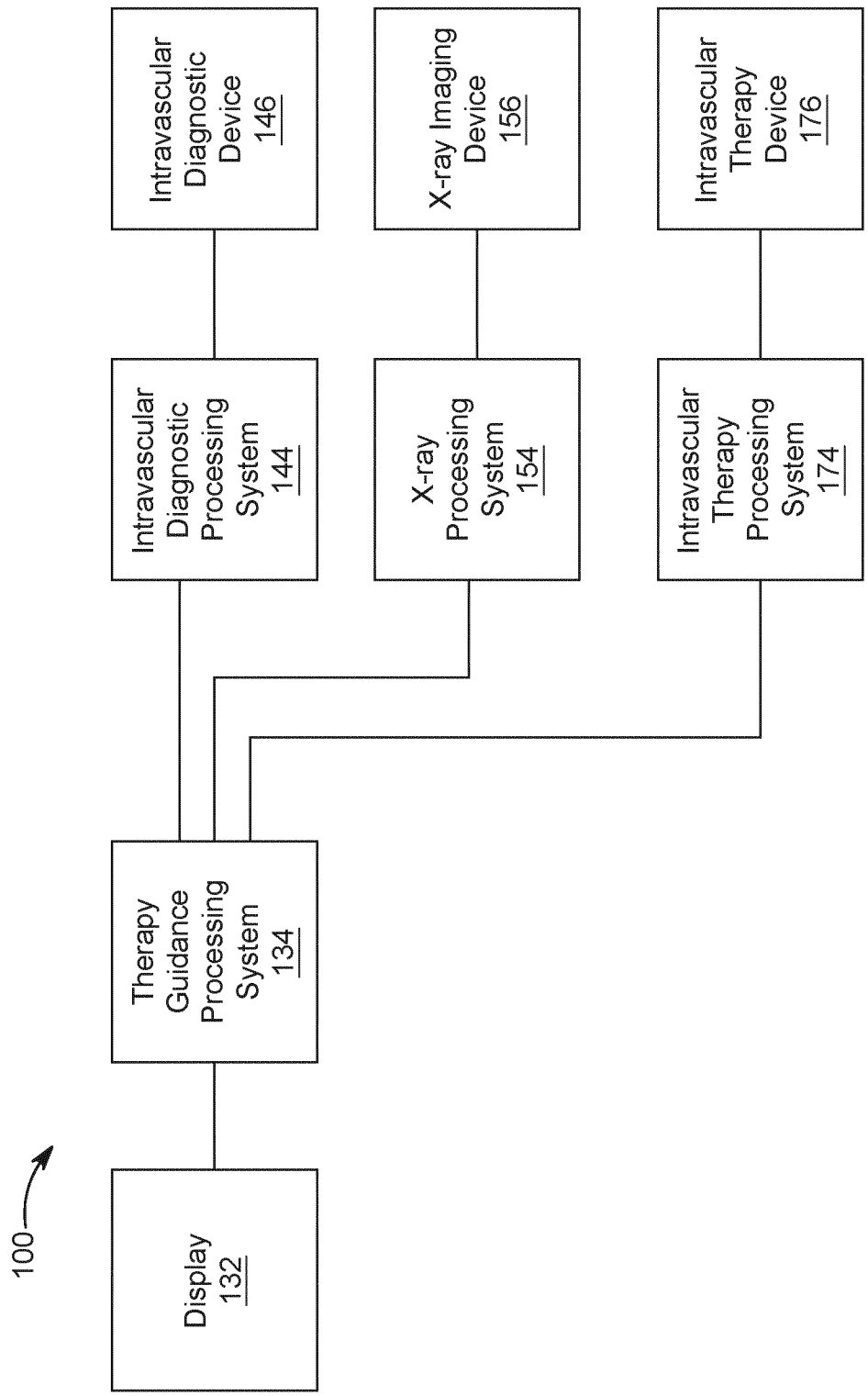
FIG. 1 is a schematic diagram of an intraluminal therapy guidance system, according to aspects of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a schematic diagram of an intraluminal therapy guidance system 100, according to aspects of the present disclosure. The therapy guidance system 100 may include an intraluminal diagnostic device 146 in communication with an intraluminal diagnostic processing system 144, an x-ray imaging device 156 in communication with an x-ray processing system 154, and an intraluminal therapy device 176 in communication with an intraluminal therapy processing system 174. In addition, the therapy guidance system 100 may include a therapy guidance processing system 134 in communication with the intraluminal diagnostic processing system 144, the x-ray processing system 154, and the intraluminal therapy processing system 174. The therapy guidance processing system 134 may additionally be in communication with a display 132 as well as any other suitable components, processors, systems, or devices. The therapy guidance system 100 may be used for many different medical procedures, such as but not limited to diagnostic procedures, planning treatment, guiding treatment (e.g., during deployment of a treatment device), and evaluating the efficacy of treatment after it has been performed.

The intraluminal therapy guidance system 100 can be an intravascular therapy guidance system in some embodiments. In such embodiments, the intravascular therapy guidance system may be used to examine and/or deliver therapy to a blood vessel, such as an artery or a vein of a patient's vascular system, including cardiac vasculature, peripheral vasculature, neural vasculature, renal vasculature. Further, in such embodiments, the intraluminal diagnostic device 146 is an intravascular diagnostic device, the intraluminal diagnostic processing system 144 is an intravascular diagnostic processing system, the intraluminal therapy device 176 is an intravascular therapy device, and the intraluminal therapy processing system 174 is an intravascular therapy processing system 174. While blood vessels are provided as an example herein, it is understood that aspects of the present disclosure can be implemented with suitable body lumen or body cavity of the patient. For example, the intraluminal therapy guidance system 100 may be used to examine and/or deliver therapy to any number of anatomical locations and tissue types, including without limitation, organs including the liver, heart, kidneys, gall bladder, pancreas, lungs; ducts; intestines; nervous system structures including the brain, dural sac, spinal cord and peripheral nerves; the urinary tract; as well as valves within the blood, chambers or other parts of the heart, and/or other systems of the body. In addition to natural structures, the intraluminal therapy guidance system 100 may be used to examine man-made structures such as, but without limitation, heart valves, stents, shunts, filters and other devices.

The therapy guidance processing system 134 shown in FIG. 1 may include any suitable hardware components, software components, or combinations of hardware and software components. For example, the processing system 134 may include any suitable circuitry, communication interfaces, processors, or processor circuits, among other components. In some embodiments, the processing system 134 may include one or more processor circuits substantially similar to the processor circuit 200 described with reference to FIG. 2. Any of the systems 144, 154, and/or 174 may also include one or more processor circuits substantially similar to the processor circuit 200 described with reference to FIG. 2. Any of the systems 144, 154, and/or 174 may also include similar features, components, hardware components, software components, or combinations thereof as that of the therapy guidance processing system 134 described.

The intravascular diagnostic processing system 144 may be configured to receive intravascular data collected with the intravascular diagnostic device 146, such as an intravascular imaging device, an intravascular pressure-sensing device, and/or intravascular flow-sensing device. The intravascular diagnostic processing system 144 may receive intravascular data via a connecting cable and/or a communication interface, such as a wireless or wired communication interface, as will be discussed in more detail with reference to FIG. 3. In some embodiments, the processing system 144 may process the received intravascular data to reconstruct an image of the tissue structures in the medium surrounding the intravascular diagnostic device 146. In other embodiments, the system 144 may process received intravascular data to calculate metrics relating to the medium surrounding the device 146 such as but not limited to the diameter of the blood vessel, cross-sectional area of the blood vessel, pressure ratio (fractional flow reserve or FFR, instantaneous wave free ratio or iFR, ratio of distal pressure to aortic/proximal pressure or Pd/Pa, and/or other hyperemic or non-hyperemic indices) of blood within the blood vessel, or flow-related quantities (flow volume, flow rate, coronary flow reserve or CFR) of blood within the blood vessel, or other physiological data or metrics. The system 144 may also perform any other suitable calculations or measurements depending on the type of device 146 and the type of data received. The intravascular diagnostic processing system 144 may be in communication with the display 132 or another display. The intravascular diagnostic processing system 144 may display images, graphical representations, metrics, or other data relating to the body lumen imaged or measured via this display.

The x-ray processing system 154 may be configured to receive extraluminal imaging data, such as x-ray data. For instance, the x-ray processing system 154 may receive angiography data and/or fluoroscopy data collected with the x-ray imaging device 156. The x-ray data may include an x-ray stream made up of individual x-ray image frames. The x-ray imaging device 156 may be of any suitable type, for example, it may be a stationary x-ray system such as a fixed c-arm x-ray device, a mobile c-arm x-ray device, a straight arm x-ray device, or a u-arm device. The x-ray imaging device 156 may additionally be any suitable mobile device. The x-ray imaging device 156 may also be in communication with the therapy guidance processing system 134.

The x-ray processing system 154 may receive extraluminal imaging data, such as x-ray angiography data via a connecting cable and/or a communication interface (e.g., a wireless and/or a wired communication interface). The angiography data can be used to generate a stream of angiographic images frames depicting the patient's anatomy. The angiography data obtained with the x-ray imaging device 156 may correspond to an anatomy with a contrast agent introduced. The contrast agent may be radiopaque and used to enhance the visibility of internal fluids or structures within a patient's anatomy. In some embodiments, the contrast agent absorbs external x-rays from an x-ray source, resulting in decreased exposure on an x-ray detector in conjunction with the x-ray source. The contrast agent may be of any suitable material, chemical, or compound and, before administration to the patient, may be a liquid, powder, paste, tablet, or of any other suitable form. For example, the contrast agent may include iodine-based compounds, barium sulfate compounds, gadolinium-based compounds, or any other suitable compounds, which may be included in a solution or suspension, for example, for administration to the patient. In some embodiments, the contrast agent may include carbon dioxide, which may be a gas. In such cases, the contrast agent may decrease absorption of the external x-rays from the x-ray source, when administered. The contrast agent may additionally be referred to as a radiocontrast agent, a contrast dye, a radiocontrast dye, a contrast material, a radiocontrast material, a contrast media, or a radiocontrast media, among other terms.

In some embodiments, the processing system 154 may process the received angiography data to reconstruct an image of the patient anatomy and/or calculate metrics relating to the anatomy based on the angiography data. In some applications, the x-ray processing system 154 may determine metrics associated with the patient anatomy using various image processing techniques or machine learning techniques. The x-ray processing system 154 may be in communication with the display 132 or another display. The x-ray processing system 154 may display images, graphical representations, metrics, or data to a user of the therapy guidance system 100 via this display.

The x-ray processing system 154 may be configured to receive fluoroscopy data (e.g., extraluminal imaging data) collected with the x-ray imaging device 156 via a connecting cable and/or a communication interface (e.g., a wireless and/or a wired communication interface). The x-ray imaging device 156 may obtain the fluoroscopy data, such as a stream of individual x-ray images of an anatomy, without a contrast agent introduced to a patient's vasculature. The fluoroscopy data can be used to generate fluoroscopic image frames depicting the patient's anatomy. In some instances, the fluoroscopic image frames can collectively form a video sequence (e.g., a stream) of x-ray images.

In some embodiments, as illustrated, the x-ray processing system 154 may be configured to receive both angiography data and fluoroscopy data collected with the x-ray imaging device 156. In other embodiments, separate x-ray processing systems may be used to receive the angiography data and fluoroscopy data. Similarly, separate x-ray imaging devices may be used to collect the angiography data and fluoroscopy data. In such embodiments, the separate x-ray processing systems may include any or all of the same features or characteristics of the x-ray processing system 154 and the separate x-ray imaging devices may include any or all of the same features or characteristics of the x-ray imaging device 156. Further, while the processing system 154 is described herein as an x-ray processing system, any suitable external imaging processing system and/or external imaging device may be used to collect and receive external imaging data (e.g., extraluminal imaging data) depicting the patient's anatomy. For example, the therapy guidance system 100 may additionally or alternatively utilize external ultrasound, computed tomography (CT), and/or magnetic resonance imaging (MRI) imaging techniques to collect suitable imaging data associated with the patient. In some embodiments, the extraluminal imaging data is extravascular imaging data of a blood vessel and the extraluminal imaging system/device is an extravascular imaging system/device.

The intravascular therapy processing system 174 may be configured to receive therapy data collected with the intravascular therapy device 176, such as a stent or balloon delivery device, a thrombectomy device, an atherectomy device, and/or the like. The intravascular therapy processing system 174 may receive the therapy data via a connecting cable and/or a communication interface (e.g., a wireless and/or a wired communication interface) as will be discussed in more detail with reference to FIG. 3. In some embodiments, the therapy data may correspond to a power level of the intravascular therapy device 176, an operational state of the intravascular therapy device 176, a duration the intravascular therapy device 176 is active (e.g., in operation), and/or the like. The intravascular therapy processing system 174 may also control operations of the intravascular therapy device 176. For example, the therapy processing system 174 may change the operational state of the intravascular therapy device 176 and/or may adjust a power level output to the intravascular therapy device 176. Moreover, in some embodiments, the intravascular therapy device 176 may not transmit therapy data to the intravascular therapy processing system 174 or another processing system (e.g., 134, 144, 154). In such cases, the intravascular therapy processing system 174 may control operations of the intravascular therapy device 176 without receiving therapy data from the intravascular therapy device 176.

In some embodiments, the systems 134, 144, 154, and/or 174 may each be a part of a combined system 100. For example, in some embodiments, the processing systems 134, 144, 154, and/or 174 may be positioned within the same enclosure or housing. In addition, the processing systems 134, 144, 154, and/or 174 may share one or more software or hardware components. To that end, one or more of the processing systems 134, 144, 154, and/or 174 may be implemented as a single processing system. As an illustrative example, the intravascular therapy processing system 174 may optionally be included in the system 100, and in some cases, the intravascular therapy device 176 may be in direct communication with the therapy guidance processing system 134 (with the intravascular therapy processing system 174 omitted). In other embodiments, the processing systems 134, 144, 154, and/or 174 may be separate systems but may be in communication with one another. The processing systems may be in continuous communication with one another or may be in intermittent communication with one another. The processing systems may be in communication with one another or with the devices 145, 156, 176, and/or the display 132 via one or more wired connecting cables including any suitable conductors, such as single conductors, twisted pairs, universal serial bus (USB) cables, or any other suitable connecting cables. The processing systems 134, 144, 154, and/or 174 may additionally or alternatively be in communication or with the devices 145, 156, 176, and/or the display 132 via a wireless connection, an optical connection, or may be in connection via any suitable type of movable memory or storage media, or via any other suitable means of communication. In some embodiments, the therapy guidance processing system 134 may receive data, including raw data and/or processed data, images, models, graphical representations, metrics, or any other information from any of the processing systems 144, 154, 164, and/or 174. The therapy guidance processing system 134 may receive such data from the other processing systems 144, 154, and/or 174 simultaneously or separately. Any and/or all of the processing systems 134, 144, 154, and/or 174 may include or be a part of any suitable system or device such as, but not limited to, a mobile console, a desktop computer, laptop computer, tablet, smartphone, or any other suitable computing device.

Figure 2:
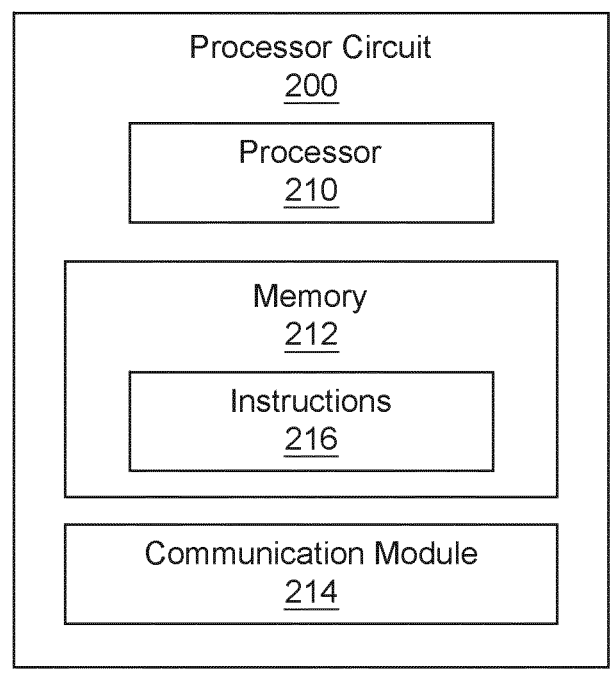
FIG. 2 is a schematic diagram of a processor circuit, according to aspects of the present disclosure.

FIG. 2 is a schematic diagram of a processor circuit 200, according to aspects of the present disclosure. The processor circuit 200 or a similar processor circuit may be implemented in any suitable device or system previously disclosed. One or more processor circuits 200 can be configured to perform the operations described herein. The processor circuit 200 can include additional circuitry or electronic components, such as those described herein. In an example, one or more processor circuits 200 may be in communication with transducer arrays, sensors, circuitry, or other components within the intravascular diagnostic device 146, the x-ray imaging device 156, and/or the intravascular therapy device 176. One or more processor circuits 200 may also be in communication with the display 132, as well as any other suitable component or circuit within the therapy guidance system 100. As shown, the processor circuit 200 may include a processor 210, a memory 212, and a communication module 214. These elements may be in direct or indirect communication with each other, for example via one or more buses.

The processor 210 may include a CPU, a GPU, a DSP, an application-specific integrated circuit (ASIC), a controller, a field programmable gate array (FPGA), another hardware device, a firmware device, or any combination thereof configured to perform the operations described herein. The processor 210 may also be implemented as a combination of computing devices, e.g., a combination of a DSP and a microprocessor, a plurality of microprocessors, one or more microprocessors in conjunction with a DSP core, or any other such configuration.

The memory 212 may include a cache memory (e.g., a cache memory of the processor 210), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 212 includes a non-transitory computer-readable medium. The memory 212 may store instructions 216. The instructions 216 may include instructions that, when executed by the processor 210, cause the processor 210 to perform the operations described herein with reference to the devices 146, 156, 176, 300, and/or the systems 134, 144, 154, and/or 174. Instructions 216 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 214 can include any electronic circuitry and/or logic circuitry to facilitate direct or indirect communication of data between the processor circuit 200, the previously described devices and systems, and/or the display 132. In that regard, the communication module 214 can be an input/output (I/O) device. For instance, the communication module 214 may include a touch sensitive pad or touch screen display, keyboard/mouse, joystick, button, scroll wheel, and/or the like. In some instances, the communication module 214 facilitates direct or indirect communication between various elements of the processor circuit 200 and/or the devices and systems of the therapy guidance system 100. Moreover, the communication module 214 may facilitate wireless and/or wired communication between various elements of the processor circuit 200 and/or the devices and systems of the therapy guidance system using any suitable communication technology, such as a cable interface such as a USB, micro USB, Lightning, or FireWire interface, Bluetooth, Wi-Fi, ZigBee, Li-Fi, or cellular data connections such as 2G/GSM, 3G/UMTS, 4G/LTE/WiMax, or 5G.

Figure 3:
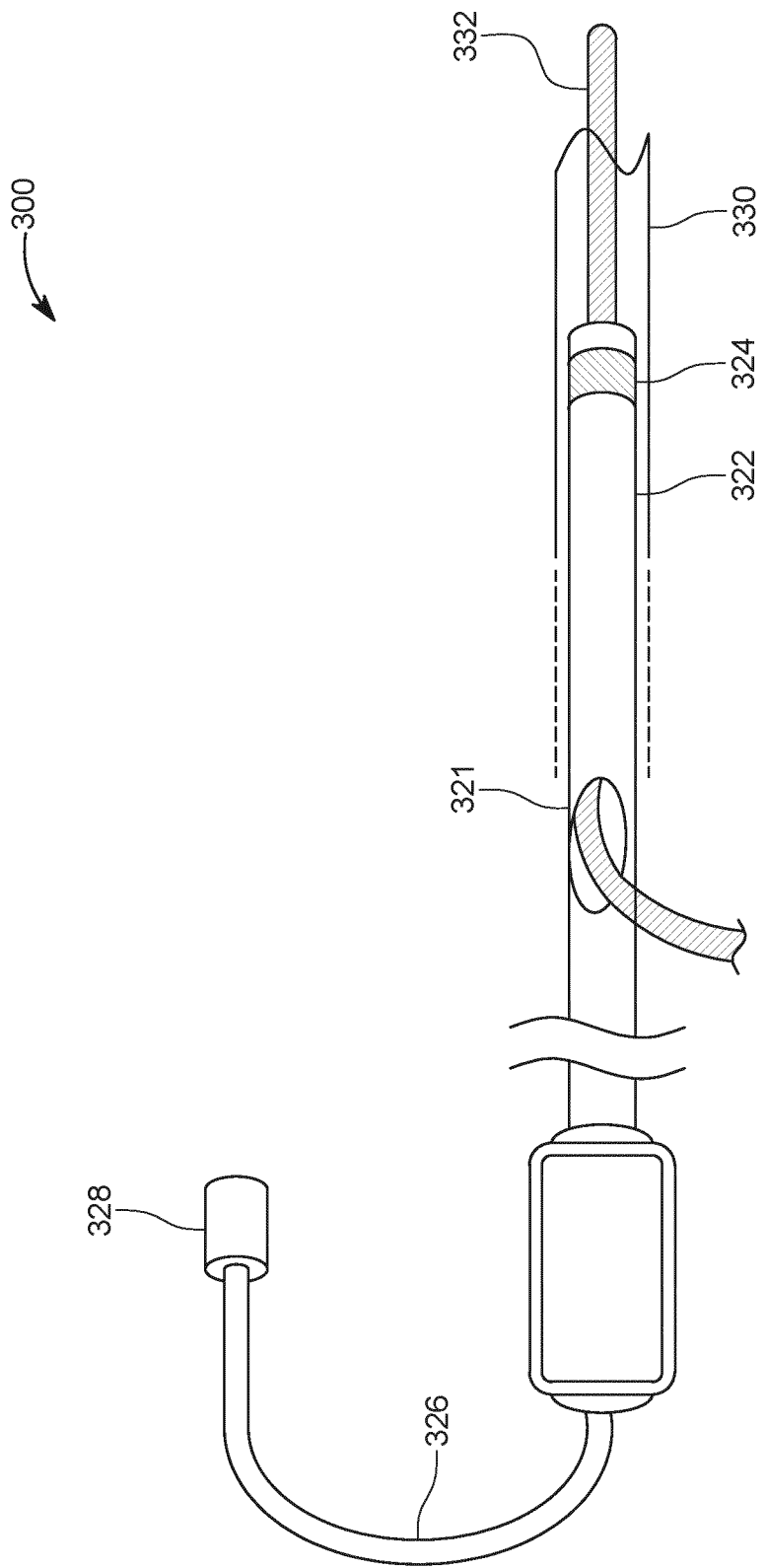
FIG. 3 is a diagrammatic view of an intravascular device, according to aspects of the present disclosure.

FIG. 3 is a diagrammatic view of an intravascular device 300, such as an intravascular diagnostic device 146 and/or an intravascular therapy device 176, according to aspects of the present disclosure. The intravascular device 300 may be any type of invasive intravascular device used to acquire data from within the body of a patient. For example, the intravascular device 300 could be a catheter, a guide wire, or a guide catheter. In general, the intravascular device 300 can be an intraluminal device that obtains data from within any suitable lumen, chamber, or anatomy within the patient's body. An intraluminal device can also be referred to as an intra-body probe or an endo-cavity probe. The intravascular device 300 can be a sensing device that obtains information about the patient's body while positioned inside the patient's body. In some instances, the intravascular device 300 is an imaging device, such as an intravascular ultrasound (IVUS) device, including a rotational IVUS device or a solid-state IVUS device, an optical coherence tomography (OCT) device, an intravascular photoacoustic (IVPA) device, an intracardiac echocardiography (ICE) device, or a transesophageal echocardiography (TEE) device. In some instances, the intravascular device 300 is a physiological-sensing device, such as a pressure-sensing device, a flow-sensing device, or a temperature-sensing device. Further, in some instances, the intravascular device 300 may be any type of invasive intravascular device used to deliver intravascular therapy. For example, the intravascular device 300 may be configured to facilitate the deployment of a stent and/or a balloon (e.g., balloon angioplasty) within the patient's vasculature. Additionally or alternatively, the device may be a thrombectomy device or an atherectomy device. The intravascular device 300 may include a flexible elongate member 321, a support assembly 322, an active component 324, a transmission line bundle or cable 326, and a patient interface module (PIM) connector 328, among other components.

At a high level, the intravascular device 300 may acquire data relating to the region of anatomy surrounding the intravascular device 300. In that regard, the intravascular device 300 can be sized, shaped, or otherwise configured to be positioned within the body lumen 330 of a patient. In some embodiments, the system 100 can include a patient interface module (PIM) communicatively disposed between the intravascular device 300 (e.g., intravascular diagnostic device 146 and/or intravascular therapy device 176) and a data processing system (e.g., intravascular diagnostic processing system 144 and/or intravascular therapy processing system 174, respectively) that receives, via the PIM connector 328 and/or the support assembly 322, the data obtained by the active component 324. The PIM may transfer the received data to the intravascular diagnostic processing system 144 and/or the intravascular therapy processing system 174. The intravascular diagnostic processing system 144 and/or the intravascular therapy processing system 174 can execute computer readable instructions stored on a non-transitory tangible computer readable medium.

The flexible elongate member 321 may be sized and shaped, structurally arranged, and/or otherwise configured to be positioned within a body lumen 330 of a patient. The flexible elongate member 321 may be a part of guidewire and/or a catheter (e.g., an inner member and/or an outer member). For example, as illustrated, the flexible elongate member is part of a catheter positioned over a guidewire 332. The flexible elongate member 321 may be constructed of any suitable flexible material. For example, the flexible elongate member 321 may be constructed of a polymer material including polyethylene, polypropylene, polystyrene, or other suitable materials that offer flexibility, resistance to corrosion, and lack of conductivity. In some embodiments, the flexible elongate member 321 may define a lumen for other components to pass through. The flexible elongate member 321 may be sufficiently flexible to successfully maneuver various turns or geometries within the vasculature of a patient. The flexible elongate member 321 may be of any suitable length or shape and may have any suitable characteristics or properties.

The support assembly 322 may be coupled to the flexible elongate member 321 and positioned at a distal portion or a distal end of the flexible elongate member 321. The support assembly 322 may house various circuitry, sensors, transducers, or any other suitable components used to acquire intravascular data. Accordingly, in some instances, the support assembly 322 may include the active component 324 and/or may include components in communication with the active component 324. For example, the support assembly 322 may include a support member, unibody, sensor housing, sensor mount, pressure sensor, flow sensor, temperature sensor, transducer array, control logic dies, various circuits, flexible substrates, various adhesives, or backing material, among other components. The support assembly 322 may provide structural support to components within the intravascular device 300. The support assembly 322 may be constructed of any suitable material, including flexible or inflexible materials. The support assembly 322 may be of any suitable shape, including a tubular or circular shape, as well as any other geometric or non-geometric shape.

The support assembly 322 can acquire data relating to the lumen in which the intravascular device 300 is positioned. The support assembly 322 may acquire this data via any suitable number or type of sensors or other measurement tools, such as the active component 324. The data obtained by the intravascular device 300 and/or the active component 324 data may be of any suitable form. In some embodiments, the active component 324 is an ultrasound transducer or ultrasound transducer array. The active component 324 can include one or more ultrasound transducer elements that emit ultrasonic energy and receive echoes that can be used to generate an ultrasound image (e.g., an IVUS image). In another embodiment, the active component 324 is a pressure sensor that acquires pressure data at one or more locations along the body lumen of the patient as the intravascular device 300 moves through the body lumen. Pressure data can be used by the processing system 144 to calculate fractional flow reserve (FFR), instantaneous wave-free ratio (iFR), Pd/Pa, and/or any other suitable pressure ratio. In another embodiment, the active component 324 is a flow sensor that obtains data related to velocity and/or volume of blood flow within a blood vessel. Flow data can be used by the processing system 144 to calculate coronary flow reserve (CFR), and/or any other suitable flow metric. For example, the flow active component 324 can be a Doppler ultrasound transducer element. In another embodiment, the active component 324 is a temperature sensor that obtains temperature data within the body lumen.

Accordingly, the active component 324 shown in FIG. 3 may be any suitable type of sensor depending on the specific application or type of intravascular device 300 including any of the components for intravascular data acquisition previously listed. In addition, the active component 324 may represent more than one sensor. For example, in some embodiments, the active component 324 may include multiple sensor devices including 2, 4, 6, 8, 16, 32, 64, 128, or more sensors, or any suitable number therebetween. In some embodiments, the active component 324 may include a transducer array. The active component 324 may additionally be a single rotating transducer. In some embodiments, the active component 324 may be one or more pressure sensors and one or more flow sensors. The active component 324, although positioned at a distal region of the support assembly 322 and the flexible elongate member 321, may be positioned at any suitable location on or within the support assembly 322 or the flexible elongate member 321.

In some embodiments, the support assembly 322 can deliver therapy to the lumen in which the intravascular device 300 is positioned. The support assembly 322 may deliver this therapy via any suitable number or type of therapy devices, such as the active component 324. In some instances, the active component 324 alone or the intravascular device 300 as a whole may be referenced as an intravascular therapy device. In some embodiments, the active component 324 is a stent or a balloon configured to be deployed from the support assembly 322 into the lumen. In another embodiment, the active component 324 may be used to perform thrombectomy. Accordingly, the active component 324 may include a coil retriever, an aspiration (e.g., suction) device, a retrievable stent, and/or any suitable thrombectomy device that may assist in the removal of a clot or occlusion from the patient's lumen. In another embodiment, the active component may be used to perform atherectomy. Thus, the active component 324 may include a laser, a blade (e.g., knife), a sanding crown, and/or any suitable atherectomy device that may assist in the cutting, shaving, sanding, vaporizing, and/or removal of atherosclerotic plaque from the patient's lumen.

The flexible elongate member 321 and/or the cable 326 include one, two, three, four, five, six, seven, or more conductors, optical fibers, or other signal communication lines. The signal communication lines are communicatively coupled to the connector 328 and the active component 324. The signal communication lines carry electrical signals, optical signals, and/or any suitable type of signal from the active component 324 to the processing system 144 and/or 176 (e.g., data obtained by the active component 324) and/or from the processing system 114 to the active component 324 (e.g., command/control signals). The cable 326 may facilitate communication between the intravascular device 300 and the intravascular diagnostic processing system 144, the intravascular therapy processing system 176, or any other control system or host system.

The cable 326 may be coupled to the patient interface module (PIM) connector 328 at a proximal portion or proximal end of the intravascular device 300. The PIM connector 328 may communicatively couple the signal communication lines to the PIM or other interface in communication with the intravascular diagnostic processing system 144 and/or the intravascular therapy system 174. The PIM connector 328 may also physically couple the intravascular device 300 to the PIM. Moreover, while the intravascular device 300 is described herein as having communication facilitated over a wired connection (e.g., via the cable 326 and/or the PIM connector 328), the intravascular device 300 may additionally or alternatively communicate with the intravascular device 300 and the intravascular diagnostic processing system 144, the intravascular therapy processing system 176, or any other control system or host system via a suitable wireless technology, such as Wi-Fi, Bluetooth, ZigBee, Li-Fi, or a cellular data connection.

In some embodiments, the intravascular device 300 and/or the PIM may perform preliminary processing of the intravascular data prior to relaying the data to the processing system. In examples of such embodiments, the intravascular device 300 and/or the PIM may perform amplification, filtering, and/or aggregating of the data. In an embodiment, the intravascular diagnostic processing system 144, the intravascular therapy processing system 176, and/or the PIM may also supply high- and low-voltage DC power to support operation of the intravascular device 300 including circuitry within the device.

As described in greater detail below, the therapy guidance system 100 may be used to provide more accurate delivery of intravascular therapy to a therapy region (e.g., treatment region) of a patient's blood vessel, which may include the site of a lesion in the blood vessel. For example, the target therapy region may be identified during an assessment of the patient's blood vessel, which may involve the use of an extraluminal image, an angiographic image, an IVUS image, an OCT image stack, and/or the like. During a subsequent intravascular therapy procedure, a patient's blood vessel, including a target therapy region, may not be readily visible in an extraluminal image, such as a fluoroscopic x-ray image, without contrast. Accordingly, estimations of the position and/or extent (e.g., length) of the therapy region may be used to deliver the intravascular therapy. Alternatively, by providing a graphical representation of the therapy region overlaid upon the extraluminal image (e.g., the fluoroscopic x-ray image), the therapy region may be identified more precisely and the intravascular therapy may be guided for more accurate delivery. In this way, a user of the therapy guidance system 100 need not estimate the location of the therapy region.

Figure 4:
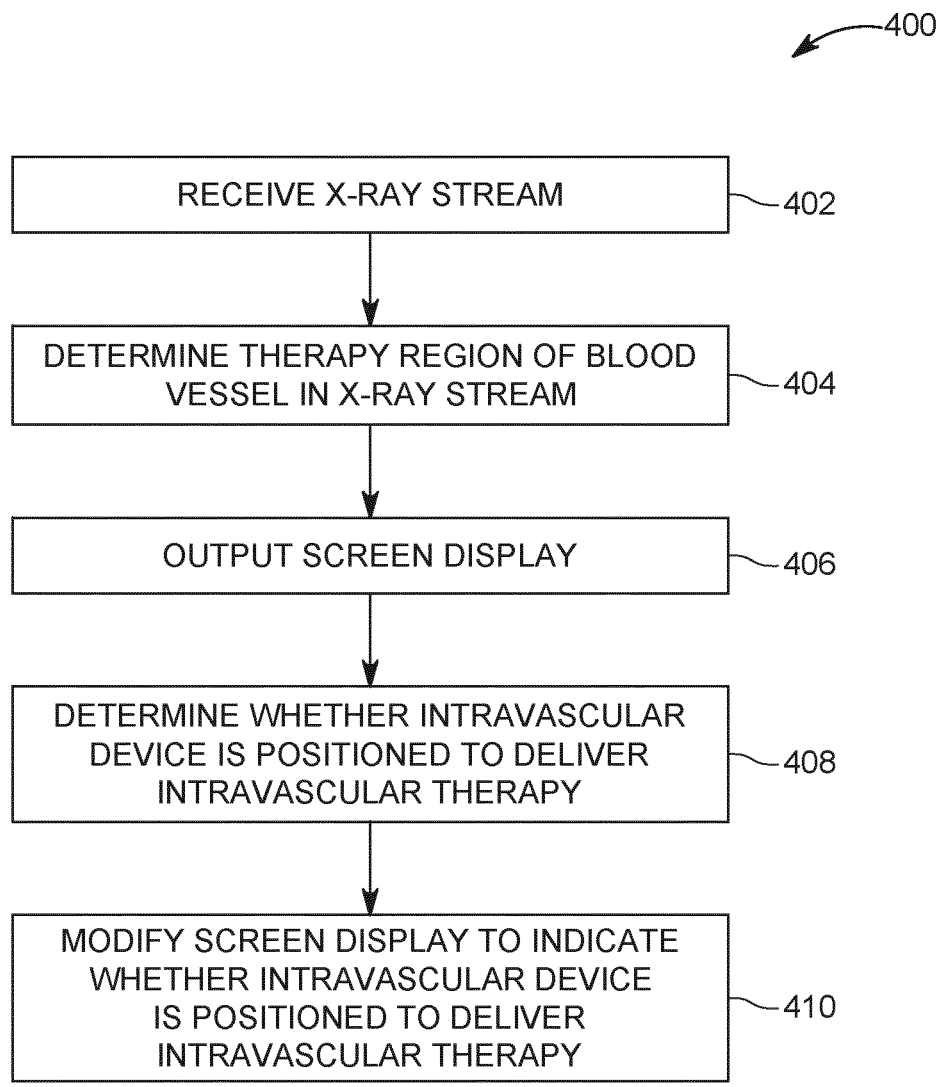
FIG. 4 is a flow diagram of a method of providing guidance for intravascular therapy delivery, according to aspects of the present disclosure.

FIG. 4 is a flow diagram of a method 400 of providing guidance for intravascular therapy delivery, according to aspects of the present disclosure. One or more steps of the method 400 will be described with reference to FIGS. 5-15. As illustrated, the method 400 includes a number of enumerated steps, but embodiments of the method 400 may include additional steps before, after, or in between the enumerated steps. In some embodiments, one or more of the enumerated steps may be omitted, performed in a different order, or performed concurrently. The steps of the method 400 can be carried out by any suitable component within the therapy guidance system 100 and all steps need not be carried out by the same component. In some embodiments, one or more steps of the method 400 can be performed by, or at the direction of, a processor circuit of the therapy guidance system 100, including, e.g., the processor 210 (FIG. 2) or any other component. Moreover, for the purposes of example, aspects of method 400 and the corresponding FIGS. 4-15A-C are described with respect to x-ray images, such as fluoroscopic images and/or angiographic images. However, it may be appreciated that any suitable extraluminal images and/or extraluminal imaging techniques (e.g., ultrasound, CT, MRI, and/or the like) may be employed, in accordance with the present disclosure.

At step 402, the method 400 includes receiving an x-ray stream. The x-ray stream may be obtained via the x-ray imaging device 156 and the x-ray processing system 144, for example. In some embodiments, the x-ray stream may include fluoroscopic image frames that depict a patient's anatomy and collectively form a video sequence. As described above, the fluoroscopic image frames of the x-ray image stream may be obtained without introducing a contrast agent to the patient's vasculature. Accordingly, the patient's vasculature may not be readily visible within the x-ray stream.

Figure 5:
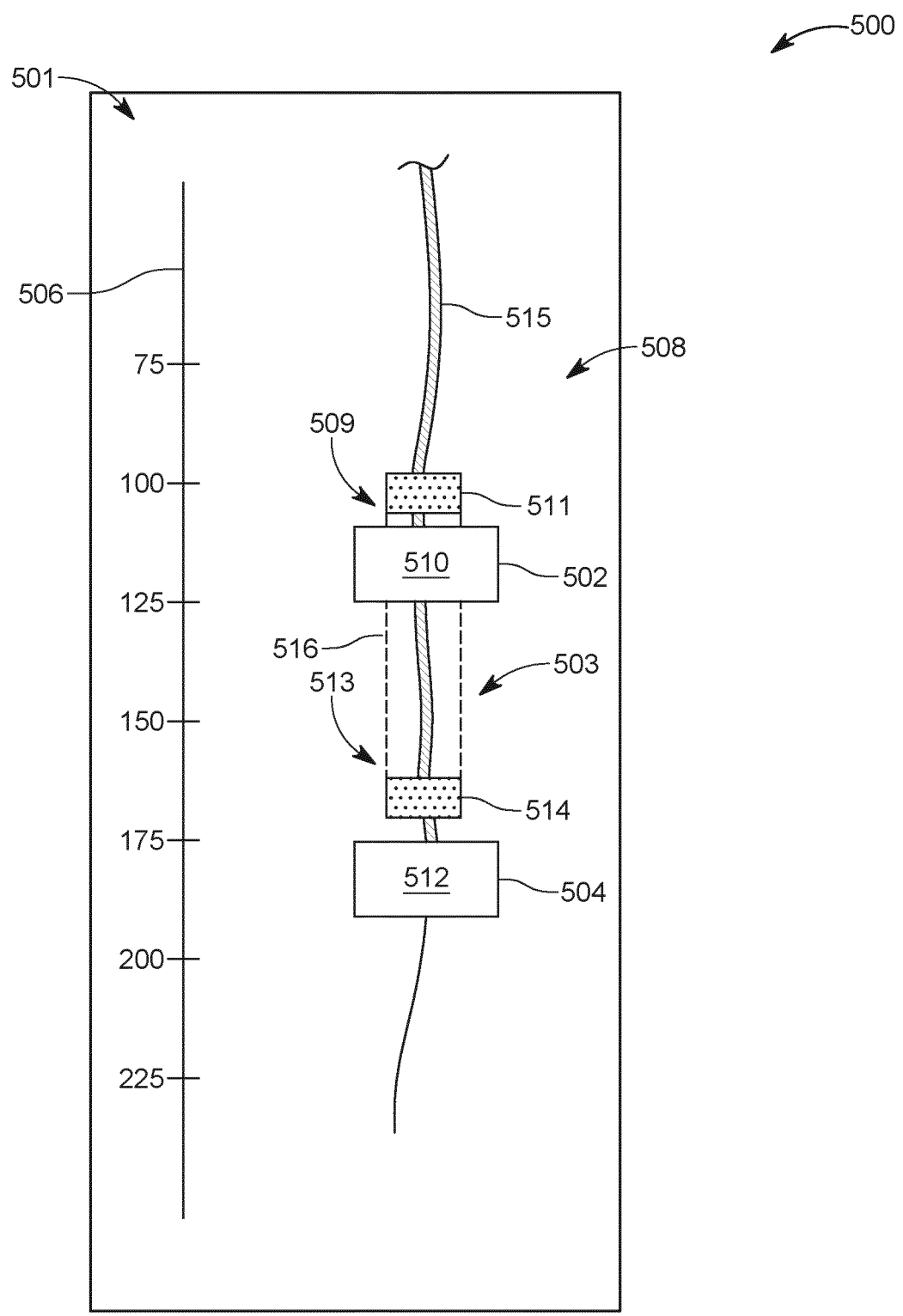
FIG. 5 is a diagrammatic view of a screen display of an x-ray fluoroscopic image stream, without contrast, identifying a proximal and distal end of a therapy region of a blood vessel, according to aspects of the present disclosure.
Figure 6:
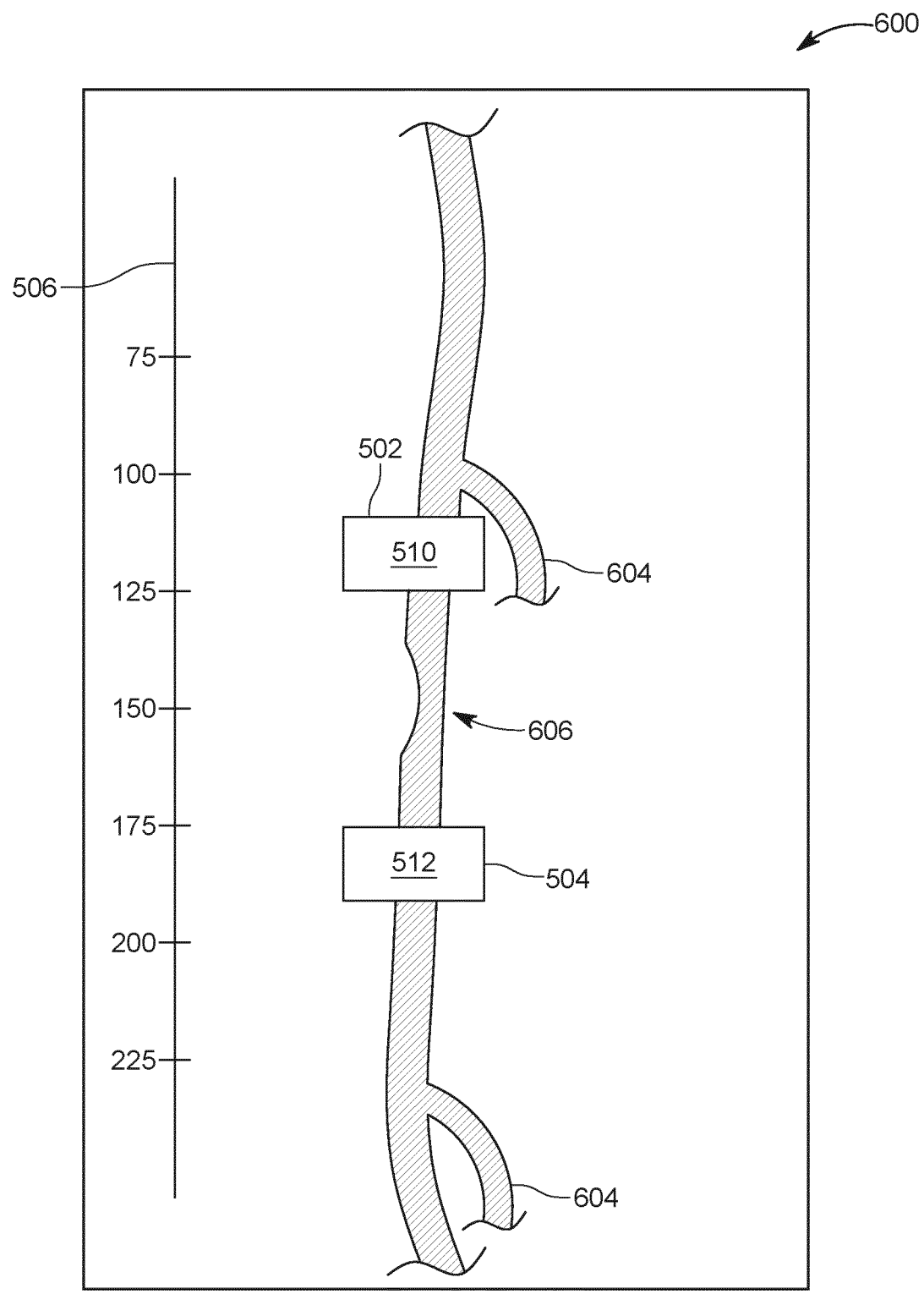
FIG. 6 is a diagrammatic view of a screen display of x-ray angiographic images, with contrast, displaying a therapy region of a blood vessel, according to aspects of the present disclosure.
Figure 11:
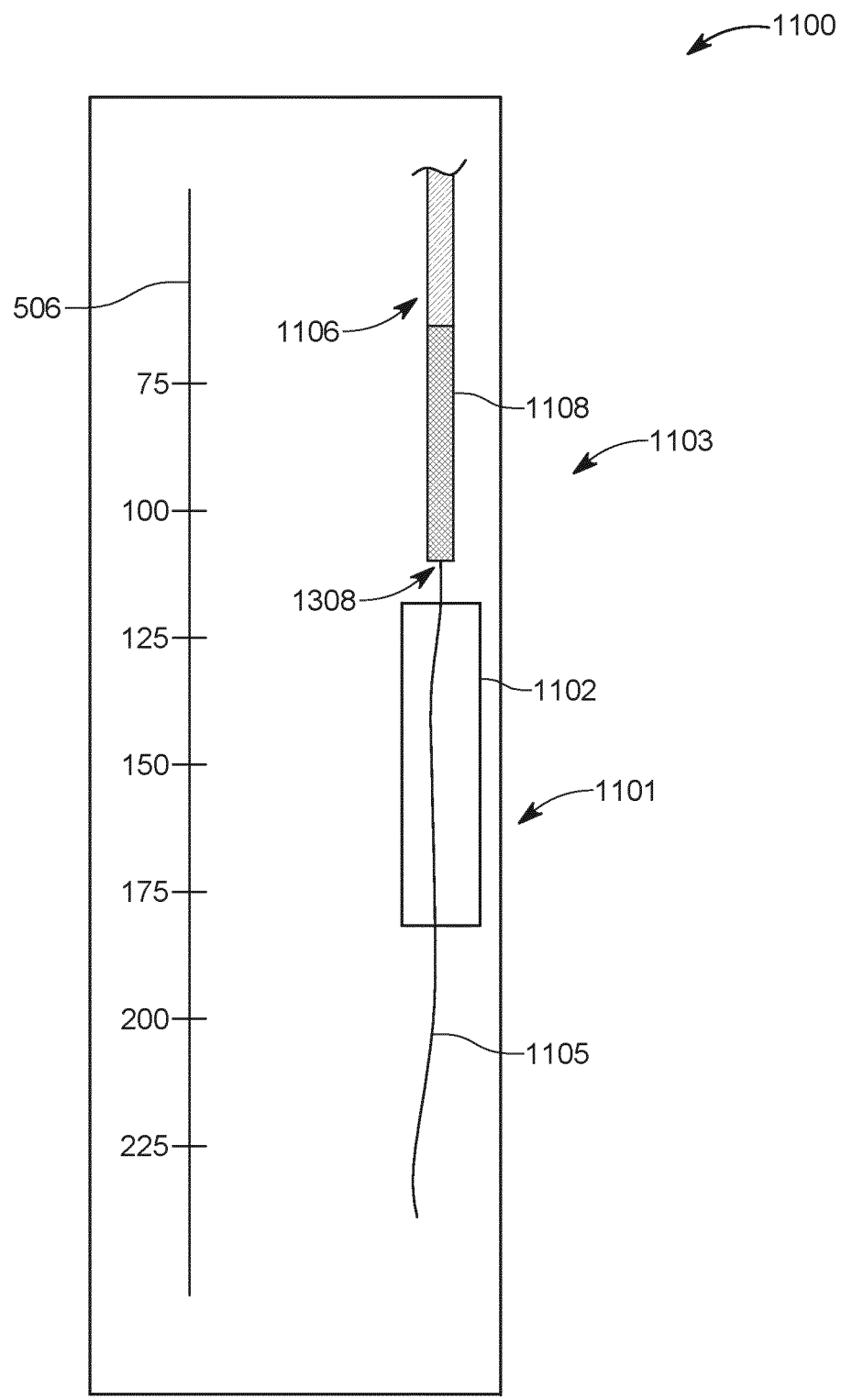
FIG. 11 is a screen display of an x-ray image stream of an x-ray fluoroscopic image stream, without contrast, identifying a therapy region of a blood vessel, according to aspects of the present disclosure.
Figure 12:
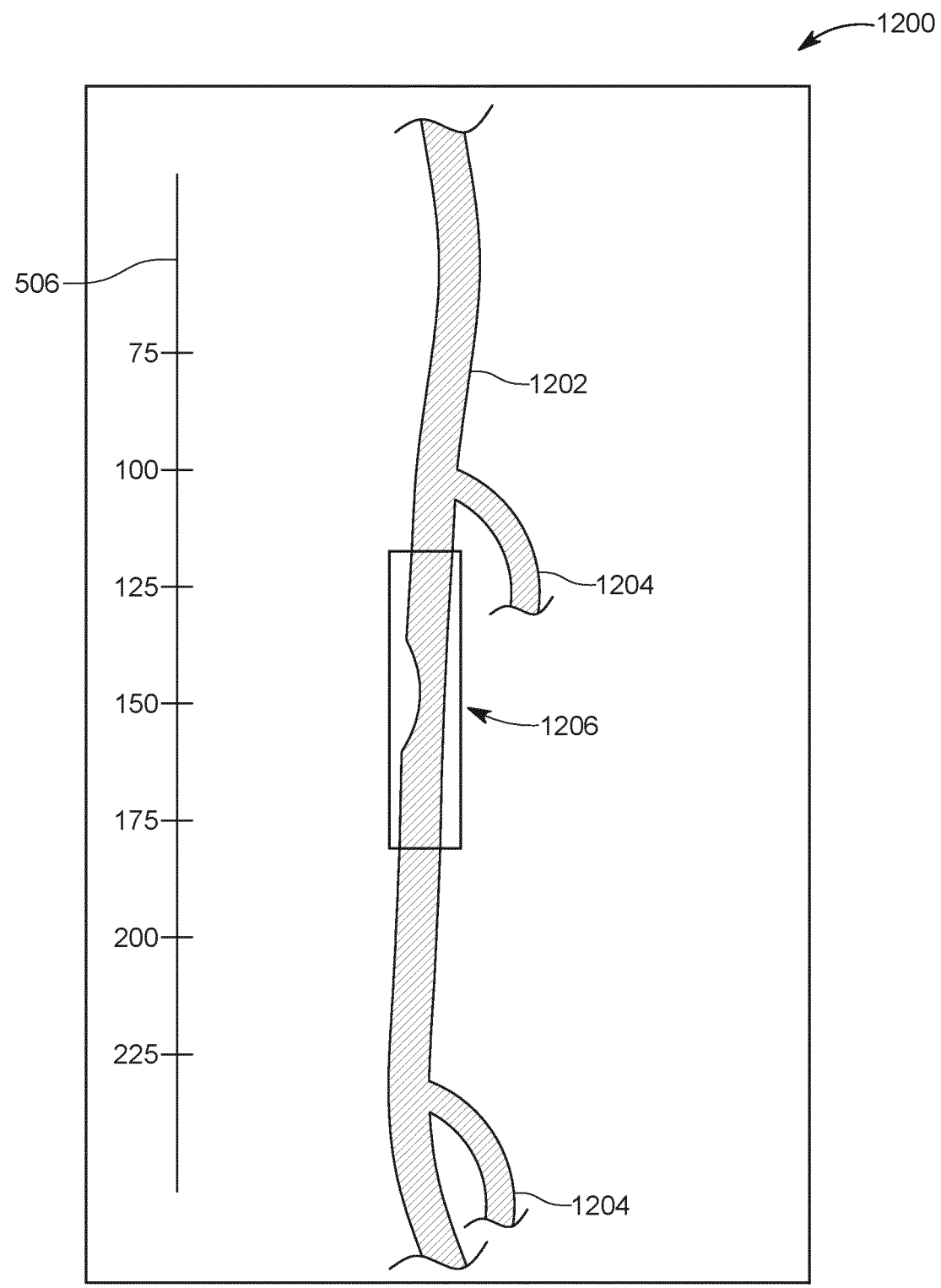
FIG. 12 is a diagrammatic view of a screen display of x-ray angiographic images, with contrast, displaying a therapy region of a blood vessel, according to aspects of the present disclosure.

At step 404, the method 400 involves determining a therapy region of a blood vessel in the x-ray stream. In some embodiments, determining the therapy region of the blood vessel may involve determining the location and/or extent (e.g., length) of the therapy region based on a user input associated with the x-ray stream. As described in greater detail below with reference to FIGS. 5-6 and 11-12, determining the therapy region of the blood vessel may involve receiving an input selecting the therapy region and/or a proximal and distal end of the therapy region. Moreover, the input may be determined based on a previous assessment of the blood vessel, which may involve the use of additional data associated with the blood vessel (e.g., an angiographic image, an IVUS image, an OCT image stack, and/or the like). For the purposes of example, FIGS. 5-6 are described as corresponding to embodiments where the intravascular therapy involves the deployment of a stent or a balloon, and FIGS. 11-12 are described as corresponding to embodiments where the intravascular therapy involves atherectomy or thrombectomy. However, it may be appreciated that aspects of each of FIGS. 5-6 and FIGS. 11-12 may be used for any suitable intravascular therapy, such as deployment of a stent or a balloon, atherectomy, thrombectomy, and/or the like.

With reference now to FIG. 5, an input selecting a proximal end 502 of the therapy region and a distal end of the therapy region 504 may be received and used to determine the therapy region 503. In some embodiments, for example, an x-ray stream 501 (e.g., the x-ray stream received at step 402) may be displayed within a graphic user interface (GUI) at the display 132. The GUI may facilitate selection of the proximal end 502 and the distal end 504 via an I/O device communicatively coupled to the display 132, such as the communication module 214. For instance, an input device, such as a touch sensitive pad or touch screen display, keyboard/mouse, joystick, button, scroll wheel, and/or the like, may be coupled to the display 132 and may facilitate the selection at the GUI. This selection of the ends of the therapy region (502, 504) may be enabled by circling, clicking, highlighting, coloring, and/or overlaying a shape upon the ends of the therapy region (502, 504) at the GUI via an I/O device, for example.

The x-ray stream 501 (e.g., an x-ray fluoroscopic image stream without contrast) illustrated in FIG. 5 includes a visualization of an intravascular device 508 (e.g., a visualization of device 300). More specifically, FIG. 5 includes a visualization of a flexible elongate member 515 (e.g., flexible elongate member 321) at a distal portion of the intravascular device 508, as well as a therapy device 516 (e.g., active component 324), such as a balloon or stent, having a proximal portion 509 terminating in a proximal end 511 and a distal portion 513 terminating in a distal end 514. To that end, the determination of the therapy region 503 of the blood vessel (at step 404) may be performed while the intravascular device 300 is present in the patient's vasculature. In such embodiments, the visualization of the intravascular device 508 may correspond to the portions of the intravascular device 300 that are radiopaque and, as a result, visible in a fluoroscopic image. In the illustrated embodiment, for example, only the proximal end 511 and the distal end 514 of the therapy device 516 are radiopaque, while the rest of the proximal portion 509 and distal portion 513 are not readily visible (as illustrated by the dashed lines). Any suitable portion of the intravascular device 508 and/or the therapy device 516 may be radiopaque, and in some embodiments, the entire therapy device 516, such as a stent, may be radiopaque. In other embodiments, the therapy region 503 of the blood vessel may be determined before the intravascular device 300 is introduced to the patient's vasculature and/or while no intravascular device 300 is present in the patient's vasculature. In any case, the patient's vasculature may not be readily visible in the x-ray image stream 501. Accordingly, before an input corresponding to selection of the therapy region 504 is received, additional data may be used to identify the therapy region 503.

Turning now to FIG. 6, in some embodiments, an angiographic image 600 and/or an angiographic image stream (e.g., x-ray angiographic images) may be used in conjunction with the x-ray stream 501 to determine the therapy region 503 of the blood vessel. For example, in some embodiments, the angiographic image 600 may be obtained by introducing a contrast agent to the patient's vasculature, as described above, so that a blood vessel 602, as well as blood vessels 604 branching from the blood vessel, are visible in the angiographic image 600. Further, by using the contrast agent, a change in the shape (e.g., diameter) of the blood vessel 604, which may result from an occlusion in the blood vessel, may be identified. For instance, the illustrated blood vessel 604 includes a narrowed region 606, which may correspond to the location of a lesion, such as a blockage (e.g., stenosis) within the blood vessel. More specifically, the narrowed region 606 may correspond to a region identified as a target for the delivery of an intravascular therapy (e.g., the therapy region), such as deployment of a stent and/or balloon (e.g., balloon angioplasty), atherectomy, or thrombectomy.

In some embodiments, a physician may identify the narrowed region 606 as a target for delivery of the intravascular therapy (e.g., an intravascular treatment region). The physician may further note the position of the narrowed region 604 relative to a reference marker 506, such as the illustrated ruler. For example, the physician may note a point proximal to the narrowed region that corresponds to healthy tissue and may note a point distal to the narrow region that also corresponds to healthy tissue so that the intravascular therapy may be performed from healthy-to-healthy tissue surrounding a lesion (e.g., narrowed region 604). For example, the intravascular therapy may be performed from the point proximal to the narrowed region to the point distal to the narrowed region, or vice versa. By noting the proximal and distal points in the angiographic image 600 and by using the same reference marker 506 in the x-ray stream 501, the physician may identify the relative location of the narrowed region 604 with or without the presence of a contrast agent in the patient's vasculature. That is, for example, using the reference marker 506 the physician may approximate the location of the proximal end of the therapy region 502 and the distal end of the therapy region 504 in the x-ray stream 501 based on a previous assessment of the location of the proximal and distal end of the therapy region 504 in the angiographic image 600. Accordingly, the input selecting the proximal end of the therapy region 502 and the distal end of the therapy region 504 may be determined based on the reference marker 506.

In some embodiments, the reference marker 506 may be an x-ray detectable marker, such as a radiopaque object (e.g., radiopaque band or sphere). The reference marker 506 may be positioned external to the patient. For example, a reference marker may be placed on or near the patient in a region imaged by the x-ray imaging device 156. For example, a radiopaque ruler may be placed on the skin of the patient, over the area being imaged using x-ray (e.g., chest, leg, groin, abdomen, etc.), such that the reference marker appears in the x-ray image. Additionally or alternatively, the reference marker 506 may be a radiopaque object within the patient, such a physiological structure (e.g., a bone) or a radiopaque medical device, in the region imaged by the x-ray imaging device 156. Moreover, as illustrated, the reference marker 506 may include a suitable measurement scale (e.g., millimeters (mm), centimeters (cm), and/or the like), which may be used to visualize the extent of the therapy region 503.

In some embodiments, the identification of the therapy region 503 may be performed or assisted by image processing techniques. For instance, a processing system (e.g., 134, 144, 154, and/or 174) may perform pixel level analysis to evaluate whether there is a change in the color of the pixel to detect a size and/or position of the therapy region 503, and, in some embodiments, the processing system may employ these image processing techniques with reference to the reference marker 506, which may involve detecting a change in the color of the pixel associated with a radiopaque portion of the reference marker 506. While identification of the therapy region 503 is described above with reference to the angiographic image 600, the therapy region 503 may additionally or alternatively be identified based on intravascular imaging data, such as intravascular ultrasound (IVUS) imaging data, OCT imaging data, and/or the like. For example, the therapy region 503 may additionally or alternatively be identified based on data, such as metadata, associated with intravascular imaging data along the length of the vessel. A processor circuit or a user can indicate which intravascular image frames represent the proximal reference location, the distal reference location, the frames between the proximal reference and the distal reference, frame(s) with the minimum lumen diameter and/or minimum lumen area between the proximal reference and the distal reference, etc. In some instances, the processor circuit identifies these intravascular image frames automatically. In some instances, a user manually identifies these intravascular image frames. The intravascular diagnostic processing system 144 and/or the therapy guidance processing system 134 can designate these intravascular image frames as corresponding to the therapy region. The processing system may include or receive intravascular imaging data, as intravascular ultrasound (IVUS) image stack, an OCT image stack, and/or the like, that includes or is associated with metadata that includes an indication of the therapy region 503. In such cases, the therapy region 503 may be identified based on the indication of the therapy region 503 in the intravascular imaging data itself and/or the metadata associated with the intravascular imaging data. The present disclosure can include aspects described with respect to intraluminal images in U.S. Provisional App. No. 62/643,105, filed Mar. 14, 2018, and titled "Scoring Intravascular Lesions and Stent Deployment in Medical Intraluminal Ultrasound Imaging," U.S. Provisional App. No. 62/643,366, filed Mar. 15, 2018, and titled "Determination and Visualization of Anatomical Landmarks for Intraluminal Lesion Assessment and Treatment Planning," U.S. Provisional App. No. 62/711,927, filed Jul. 30, 2018, and titled "Systems, Devices, and Methods for Displaying Multiple Intraluminal Images in Luminal Assessment With Medical Imaging," U.S. Provisional App. No. 62/957391, filed Jan. 6, 2020, and titled "Intraluminal Imaging Based Detection and Visualization Of Intraluminal Treatment Anomalies," and U.S. Provisional App. No. 62/969857, filed Feb. 4, 2020, and titled "Automatic Intraluminal Imaging-Based Target and Reference Image Frame Detection and Associated Devices, Systems, And Methods," which are incorporated by reference herein in their entireties.

Returning now to FIG. 4, at step 406, the method may include outputting a screen display. For example, the screen display may be output for display at display 132. In some embodiments, the screen display may include the x-ray stream 501, as well as a graphical representation of the therapy region. The graphical representation of the therapy region may be determined based on the determination at step 404. As illustrated in FIG. 5, for instance, the screen display 500 may include a graphical representation of the proximal end of the therapy region 510 and a graphical representation of the distal end of the therapy region 512 based on the selection received at step 404. Each of the graphical representations (510, 512) may be overlaid on the x-ray stream 501 in the screen display 500. Further, while the graphical representation of the therapy region 503 is illustrated as icons corresponding to the proximal end 502 and the distal end 504, the graphical representation of the therapy region may additionally or alternatively include a highlighting of the entire therapy region 503 or a portion thereof. Further, it should be appreciated that the graphical representation of the therapy region may be positioned in any suitable location and with any suitable sizing on the screen display 500. For example, the graphical representation of the therapy region may be overlaid upon the reference marker 506, adjacent to the reference marker 506 and/or the like.

Moreover, in some embodiments, the graphical representation of the therapy region may depend on the type of intravascular therapy being delivered to the patient. To that end, for the purposes of example, the illustrated screen display 500 is described herein as corresponding to the delivery of a stent or balloon intervention therapy. However, it may be appreciated that the screen display 500 may additionally or alternatively be used for any suitable intravascular therapy including, thrombectomy and atherectomy, among other therapies.

With reference now to FIG. 4, at step 408, the method 400 may include determining whether an intravascular device (e.g., intravascular device 300), is positioned to deliver intravascular therapy. In some embodiments, determining whether the intravascular device 300 is positioned to deliver therapy may involve identifying the intravascular device 300 within the x-ray stream 501. For instance, at least a portion of the intravascular device 300 and/or a portion of a therapy device associated with (e.g., delivered by) the intravascular device 300, such as a stent, may be radiopaque and, as a result, detectable within the x-ray stream 501. Accordingly, in some embodiments, the x-ray processing system 154 and/or the therapy guidance processing system 134 may perform image processing to identify the position of the intravascular device 300 based on locating one or more radiopaque portions of the intravascular and/or therapy device. An example of image processing includes conducting a pixel level analysis to evaluate whether there is a change in the color of the pixel (e.g., the edge of a radiopaque object). The x-ray processing system 154 and/or the therapy guidance processing system 134 may then compare the position of the intravascular device 300 to the position and/or extent (e.g., length) of the therapy region 503 to determine whether the intravascular device 300 is positioned to deliver intravascular therapy. For example, as described in greater detail below, determining whether the intravascular device 300 is positioned to deliver therapy may involve determining whether the intravascular device 300 is located within the therapy region 503, determining a length of the therapy device (e.g., a balloon or stent), and/or determining a duration the intravascular device 300 is positioned within the therapy region 503, among other things. Determining whether the intravascular device 300 is positioned to deliver therapy can include determining if the intravascular device is aligned with, adjacent to, within, proximate to, near, and/or otherwise in a desired spatial relationship with the therapy region 503.

Figure 13:
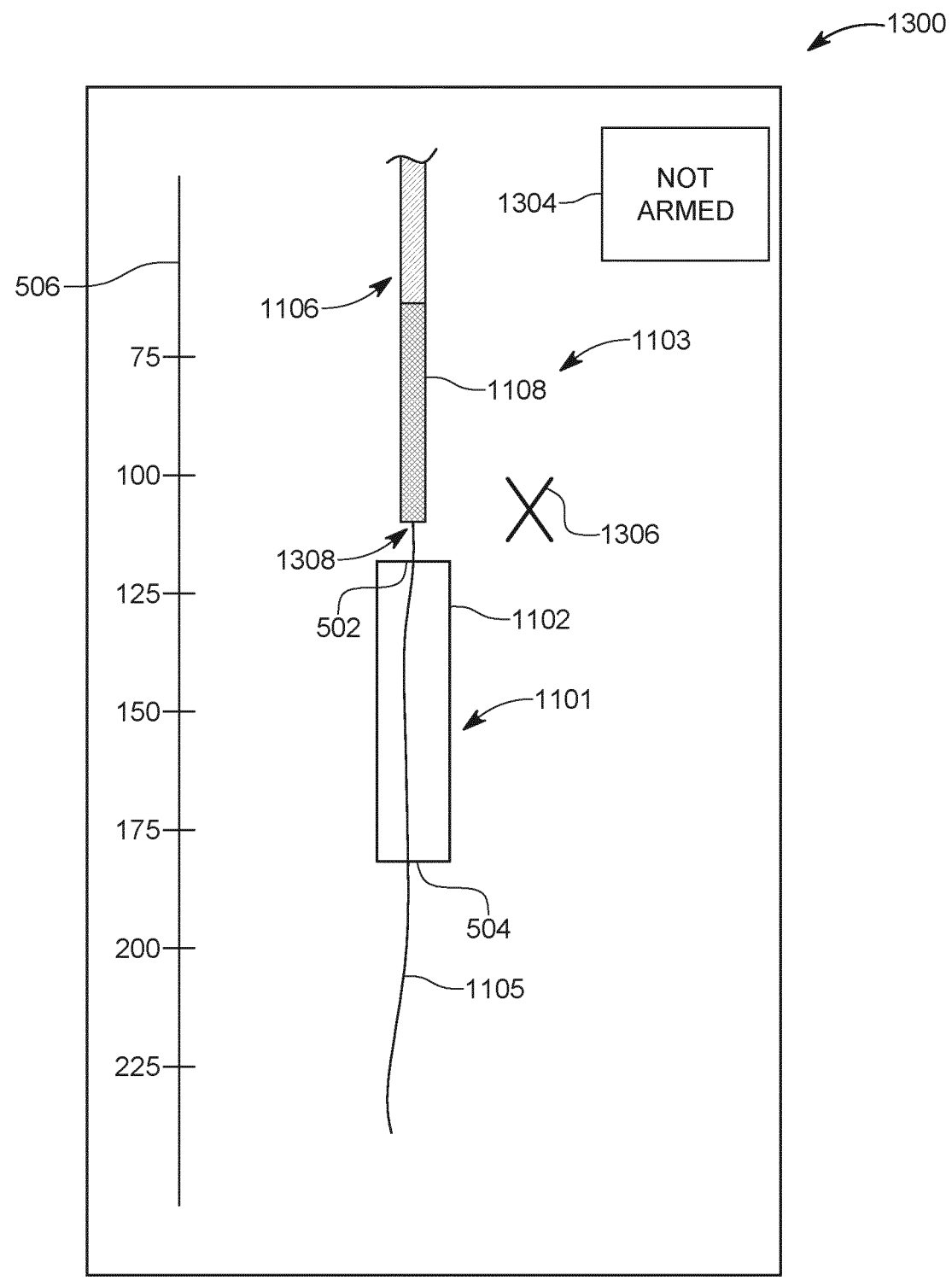
FIG. 13 is a diagrammatic view of a screen display of an x-ray fluoroscopic image stream, without contrast, modified to indicate that an intravascular device is not positioned to deliver intravascular therapy to a therapy region of a blood vessel, according to aspects of the present disclosure.
Figure 14:
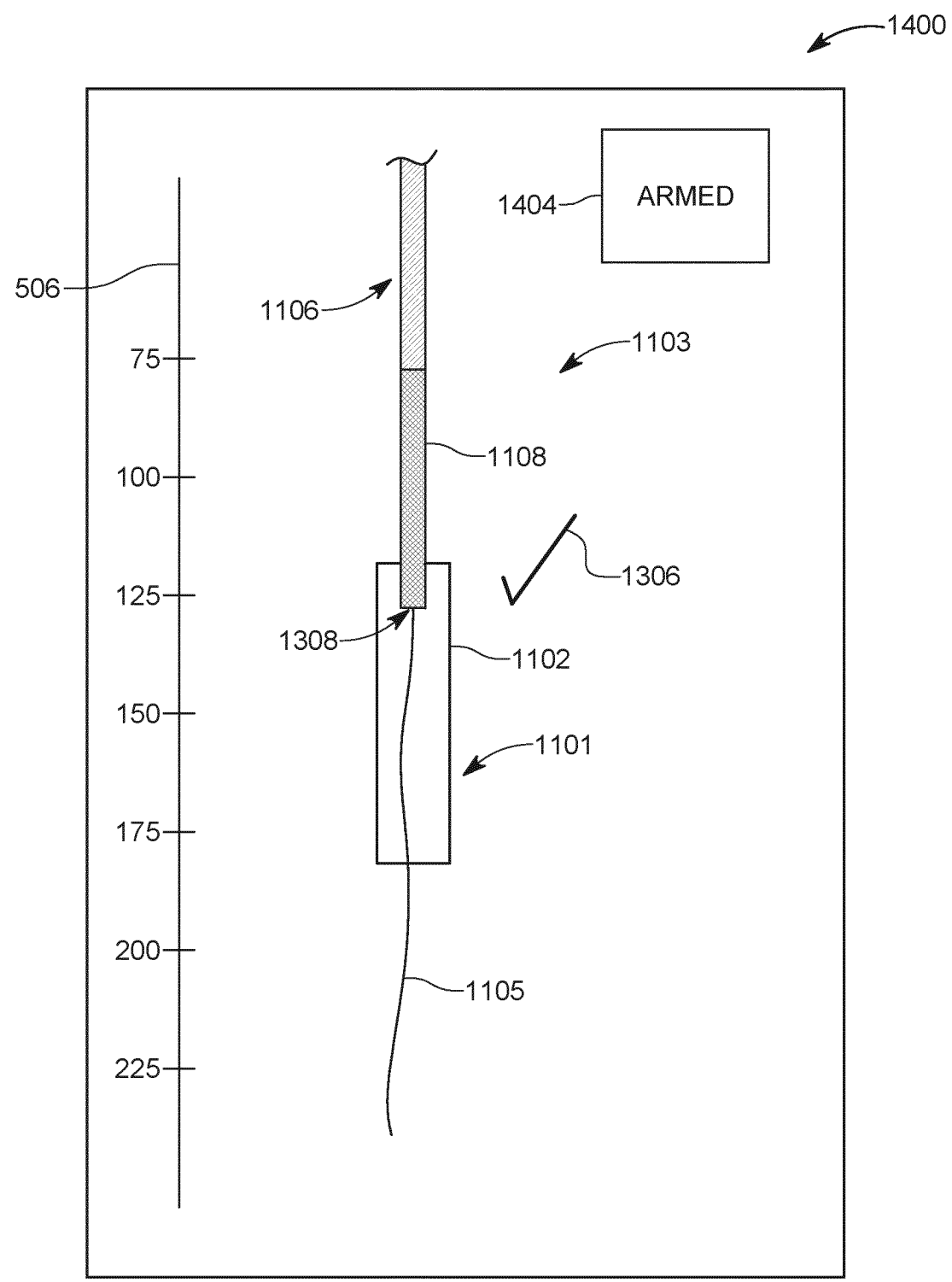
FIG. 14 is a diagrammatic view of a screen display of an x-ray fluoroscopic image stream, without contrast, modified to indicate that an intravascular device is positioned to deliver intravascular therapy to a therapy region of a blood vessel, according to aspects of the present disclosure.

At step 410, the method 400 may include modifying the screen display 500 to indicate whether the intravascular device 300 is positioned to deliver intravascular therapy. For example, the screen display 500 may be modified based on the determination made at step 408 of the method 400. As described in greater detail below with reference to FIGS. 7-10 and 13-15, modifying the screen display 500 may involve modifying the screen display 500 to indicate the position of the intravascular device 300 and/or a therapy device relative to the therapy region 503, an operational state of the intravascular device 300, a length of a therapy device, and/or a duration the intravascular device 300 is positioned within the therapy region 503. For the purposes of example, FIGS. 7-10 are described as corresponding to embodiments where the intravascular therapy involves the deployment of a stent or a balloon, and FIGS. 13-15 are described as corresponding to embodiments where the intravascular therapy involves atherectomy or thrombectomy. However, it may be appreciated that aspects of any of FIGS. 7-10 and FIGS. 13-15 may be used for any suitable intravascular therapy, such as deployment of a stent or a balloon, atherectomy, thrombectomy, and/or the like.

Figure 7:
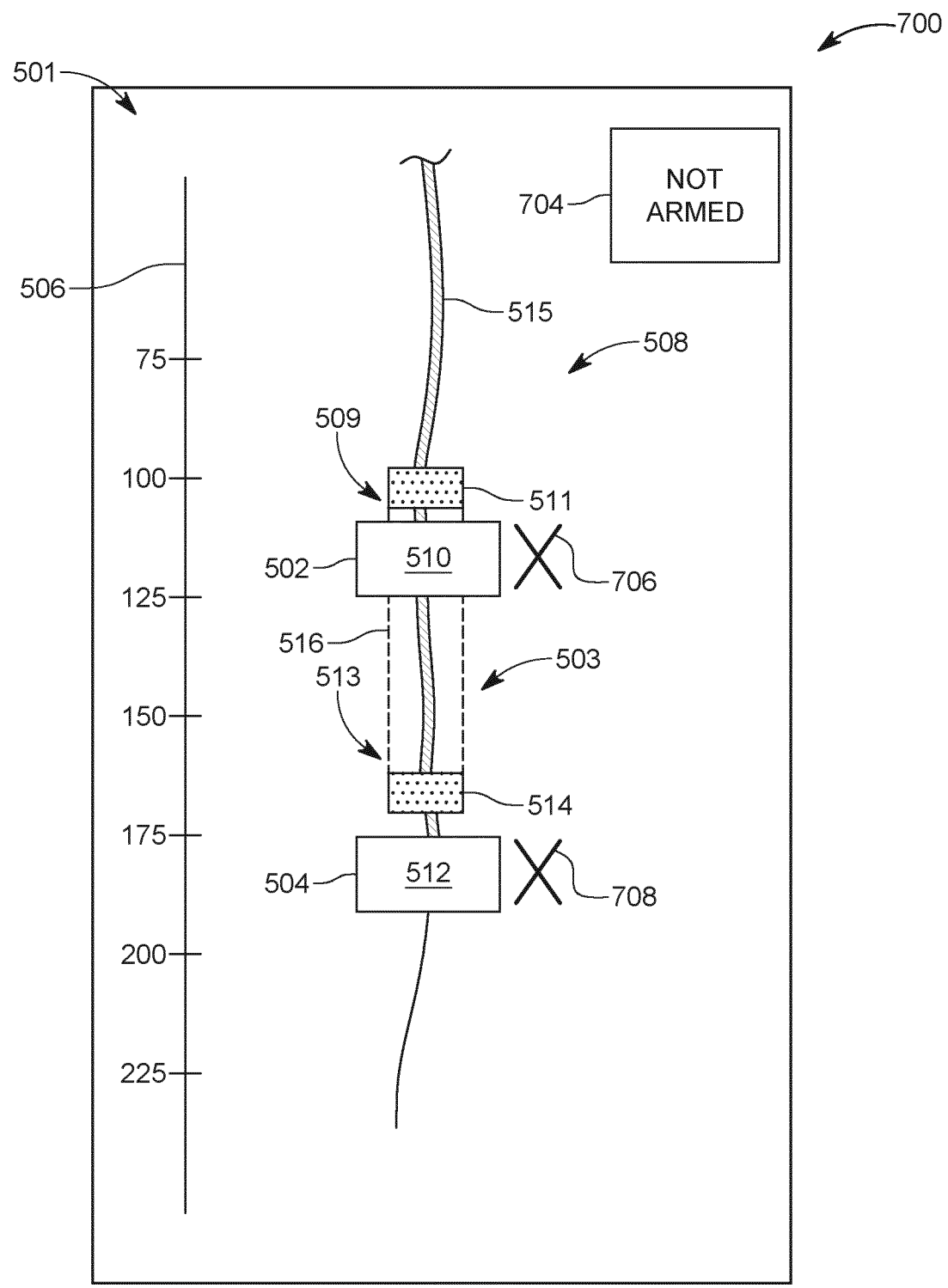
FIG. 7 is a diagrammatic view of a screen display of an x-ray fluoroscopic image stream, without contrast, modified to indicate that an intravascular device is not positioned to deliver intravascular therapy to a therapy region of a blood vessel, according to aspects of the present disclosure.

FIG. 7 illustrates a screen display 700 modified to indicate that the intravascular device is not positioned to deliver intravascular therapy. In some embodiments, the screen display 700 is modified to indicate that the intravascular device 300 is not positioned to deliver the intravascular therapy by indicating that an operational state of the intravascular device 300 is not armed and/or that a position of a therapy device 516 to be delivered by the intravascular device 300 is out of alignment with the therapy region 503. For example, as illustrated, the screen display 700 may include a dialog box 704 that represents the operational state of the intravascular device 300, a proximal alignment icon 706 that represents a state of alignment between a proximal end of the therapy device 511 with the proximal end of the therapy region 502, and/or a distal alignment icon 608 that represents a state of alignment between a distal end of the therapy device 514 with the distal end of the therapy device 504.

In some embodiments, the intravascular device 300 may include a first operational state (e.g., first state) and a second operational state (e.g., second state). In the first operational state, the intravascular device 300 may be armed to deliver intravascular therapy. For example, in the first operational state, the intravascular device 300 may deliver the intravascular therapy in response to an input signaling to begin delivery of the therapy. The input may correspond to a user input or may be automatically generated by the therapy guidance processing system 134, for example. In the second operational state, on the other hand, the intravascular device 300 may be disarmed. Accordingly, in the second operational state, the intravascular device 300 may be prevented (e.g., blocked) from delivering the intravascular therapy by conditional logic and/or an electromechanical control, for example. Thus, even if the input to begin delivery of therapy is received at the therapy guidance processing system 134, for example, the intravascular device 300 will not deliver intravascular therapy in the second operational state.

The therapy guidance processing system 134 may determine whether to place the intravascular device 300 in the first or second operational state based on the location of the intravascular device 300 relative to the therapy region 503. Further, based on the location of the intravascular device 300, the therapy guidance processing system 134 may automatically update the operational state of the intravascular device 300. For example, the therapy guidance processing system 134 may operate the intravascular device 300 in the first operational state (e.g., armed) when the intravascular device 300 is within the therapy region 503 and may operate the intravascular device 300 in a second operational state (e.g., disarmed) when the intravascular device 300 is outside the therapy region 503. An example of automatically operating the intravascular device 300 according to a first operational state or a second operational state is described in International Application No. PCT/EP2019/061472, filed May 5, 2019, titled "SYSTEM FOR AFFECTING A SUBJECT," and published as International Publication No. WO 2019/215056, the entirety of which is hereby incorporated by reference.

Thus, as illustrated in FIG. 7, in response to determining the intravascular device 300 is not positioned to deliver intravascular therapy, the dialog box 704 of the screen display 700 may be modified to indicate that the intravascular device 300 is not armed (e.g., disarmed) to deliver intravascular therapy.

In some embodiments, the screen display 700 may be modified and/or configured to represent whether the intravascular device 300 is positioned to deliver therapy by representing a state of alignment of a distal end of a therapy device 514 with the distal end of the therapy region 504 and a state of alignment of a proximal end of a therapy device 511 with the proximal end of the therapy region 502. For the purposes of the illustrated example, the therapy device may be a balloon or a stent. However, it should be appreciated that embodiments of the present disclosure are not intended to be limited thereto and that the disclosed techniques may be applied to other therapy devices, such as a thrombectomy device or an atherectomy device.

As illustrated in FIG. 7, in response to determining that the proximal end of the therapy device 511 is not aligned with the proximal end of the therapy region 502, the screen display 700 may be modified and/or configured to indicate the lack of alignment via the proximal alignment icon 706. Accordingly, in some embodiments, the proximal alignment icon 706 may display an 'X' or another suitable shape that conveys the lack of alignment at the proximal end 502. Similarly, in response to determining that the distal end of the therapy device 514 is not aligned with the distal end of the therapy region 504, the screen display 700 may be modified and/or configured to indicate the lack of alignment via the distal alignment icon 608. Accordingly, in some embodiments, the distal alignment icon 608 may display an 'X' or another suitable shape that conveys the lack of alignment at the distal end 504.

While the proximal alignment icon 706 and the distal alignment icon 608 are each illustrated with a particular shape and position, it should be appreciated that the proximal alignment icon 706 and the distal alignment icon 608 may be displayed in any suitable position on the screen display 700 and as a different icon, such as a warning or error symbol, or any other suitable shape. For example, in some embodiments, the proximal alignment icon 706 and/or the distal alignment icon 608 may be displayed as a distance measurement between the proximal end of the therapy device 511 and the proximal end of the therapy region 502 or between the distal end of the therapy device 514 and the distal end of the therapy region 504, respectively. In such embodiments, a distance of 0 millimeters (0 mm) or a distance within a threshold (e.g., 1 mm, 2 mm, and/or the like) may represent proper alignment between an end of the therapy device and an end of the therapy region (502, 504), while a distance greater than 0 mm or greater than the threshold may represent improper or a lack of alignment between the end of the therapy device and the end of the therapy region (502, 504). Moreover, the proximal alignment icon 706 and the distal alignment icon 608 may be displayed as the same icon or different icons. Further, in some embodiments, the color of the proximal alignment icon 706 and the distal alignment icon 608 may be used to represent a state of alignment between the therapy device and the therapy region 503. For example, the color of the proximal alignment icon 706 and the distal alignment icon 608 may be displayed as red to represent misalignment and may be displayed as green to represent proper alignment.

Further, in some embodiments, the graphical representations of the proximal and distal ends of the therapy region (510 and 512, respectively), themselves, may be modified in the screen display 700 to represent a state of alignment between the therapy device and the therapy region in addition to or in the alternative of the proximal alignment icon 706 and the distal alignment icon 608. For example, in some embodiments, the graphical representations of the proximal and distal ends of the therapy region (510 and 512, respectively) may change color and/or shape to represent the state of the alignment. For instance, the proximal and distal ends of the therapy region (510 and 512, respectively) may be colored green to indicate proper alignment between the therapy device and the therapy region 503 and may be colored red to indicate improper alignment between the therapy device and the therapy region 503. Additionally or alternatively, the therapy region 503 may be entirely colored or highlighted to indicate the state of alignment between the therapy device and the therapy region 503. Further, any suitable combination of the graphical representations described herein may be used to illustrate a state of alignment between the therapy device and the therapy region. Moreover, it may be appreciated that the graphical representations illustrated in FIG. 7 are exemplary and that graphical representations may be omitted and/or additional graphical representations may be included in the screen display 700 in accordance with the embodiments described herein.

Figure 8:
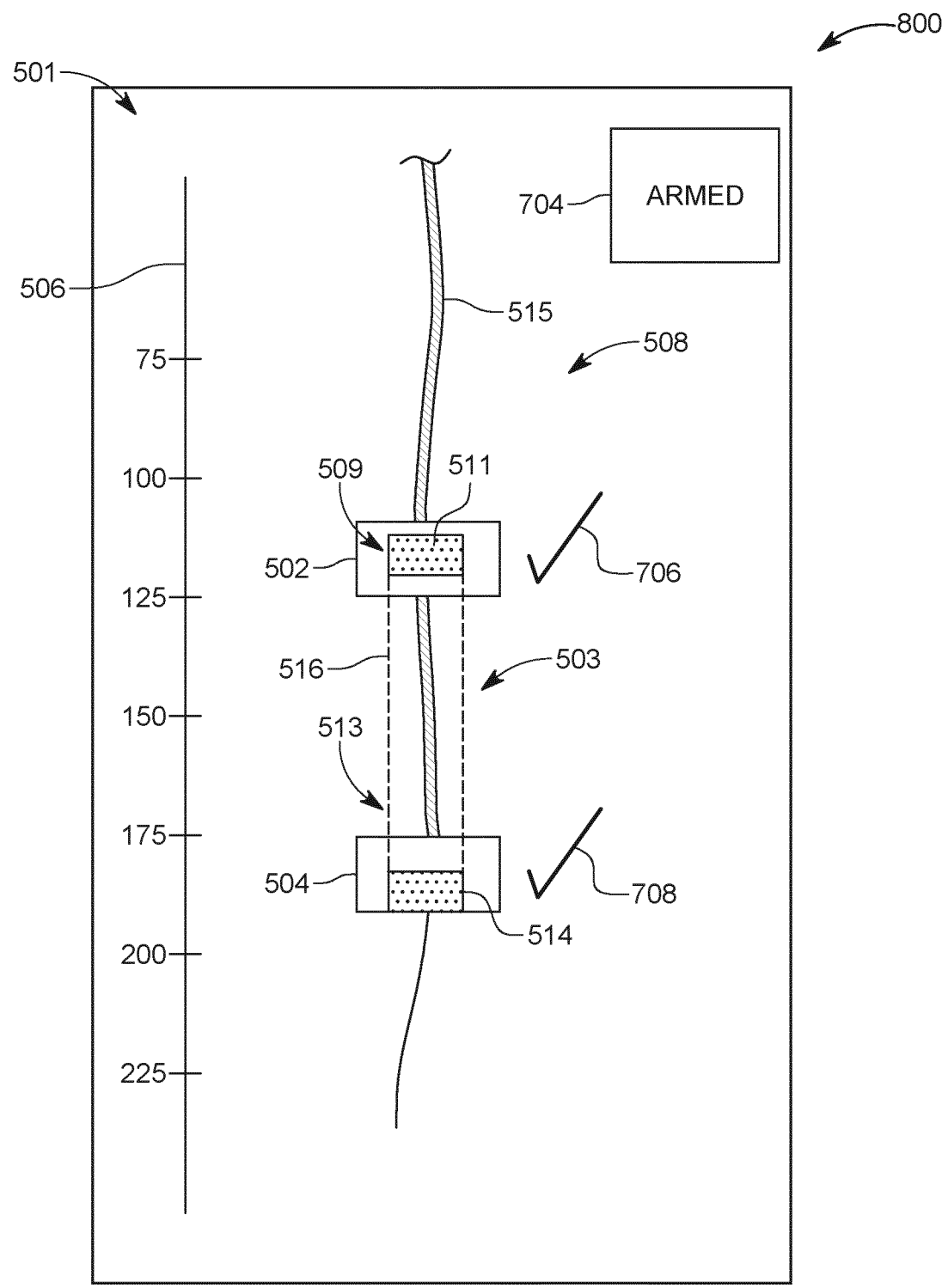
FIG. 8 is a diagrammatic view of a screen display of an x-ray fluoroscopic image stream, without contrast, modified to indicate that an intravascular is positioned to deliver intravascular therapy to a therapy region of a blood vessel, according to aspects of the present disclosure.

FIG. 8 illustrates a screen display 800 modified to indicate that the intravascular device 300 is positioned to deliver intravascular therapy. In some embodiments, the screen display 800 is modified to indicate that the intravascular device 300 is positioned to deliver the intravascular therapy by indicating that an operational state of the intravascular device 300 is armed and/or that a position of a therapy device to be delivered by the intravascular device 300 is in alignment with the therapy region 503. For example, as illustrated, the dialog box 704 indicates that the therapy device is armed, and each of the proximal alignment icon 706 and the distal alignment icon 708 indicate that the therapy device is in alignment with the therapy region 503. More specifically, the proximal alignment icon 706 indicates that the proximal end of the therapy device 511 is in alignment with the proximal end of the therapy region 502, and the distal alignment icon 708 indicates that the distal end of the therapy device 514 is in alignment with the distal end of the therapy region 504. Further, as discussed above, each of the dialog box 704, the proximal alignment icon 706, and the distal alignment icon 708 may be modified to indicate proper alignment of the therapy device with the therapy region 503 in response to the determination that the intravascular device 300 is positioned to deliver intravascular therapy at step 408 of FIG. 4.

In some embodiments, a length of the therapy device and/or a length of the therapy region may be determined through imaging processing at the therapy guidance processing system 134 and/or the x-ray processing system 154, for example. Moreover, the length of the therapy device 516 and the length of the therapy region 503 may be determined relative to one another and/or with reference to a measurement scale, which may be provided by the reference marker 506. In particular, a processing system of the therapy guidance system 100 (FIG. 1) (e.g., processing system 134, 144, 154, and/or 174) may receive an input indicating the scale of the x-ray image stream 501 or may detect the scale of the x-ray image stream 501 based on an image processing analysis of the reference marker 506. For instance, the processing system may receive a user input via an I/O device (e.g., via communication module 214) providing the scale of the x-ray stream 501, providing a measurement of an element imaged in the x-ray stream 501 (e.g., a measurement of the therapy device 516, the reference marker 506, the therapy region 503, and/or the like), which may be used as a reference for other elements imaged in the x-ray stream 501, and/or the like. After receiving and/or detecting the scale of the x-ray image, the processing system may determine the length of the therapy region 503 and/or the therapy device 516 with reference to the scale. Additionally or alternatively, the processing system may use a known dimension (e.g., a standard measurement) to determine the length of the therapy region 503 and/or the therapy device 516. As an illustrative example, the processing system may be configured to detect a portion of the intravascular device 300 and/or the therapy device 516, such as a guide catheter, and may associate the detected portion with a predetermined (e.g., preconfigured) measurement value. As a further example, the reference marker 506 may be similarly associated with a predetermined measurement value. In such cases, the processing system may use the identified predetermined measurement value to establish the scale of the x-ray image stream 501 and/or to measure other elements, such as the therapy region 503, imaged within the image stream 501. Accordingly, a screen display may be modified to indicate a length of the therapy device 516 and/or a length of the therapy region 503, as illustrated in FIGS. 9-10.

Figure 9:
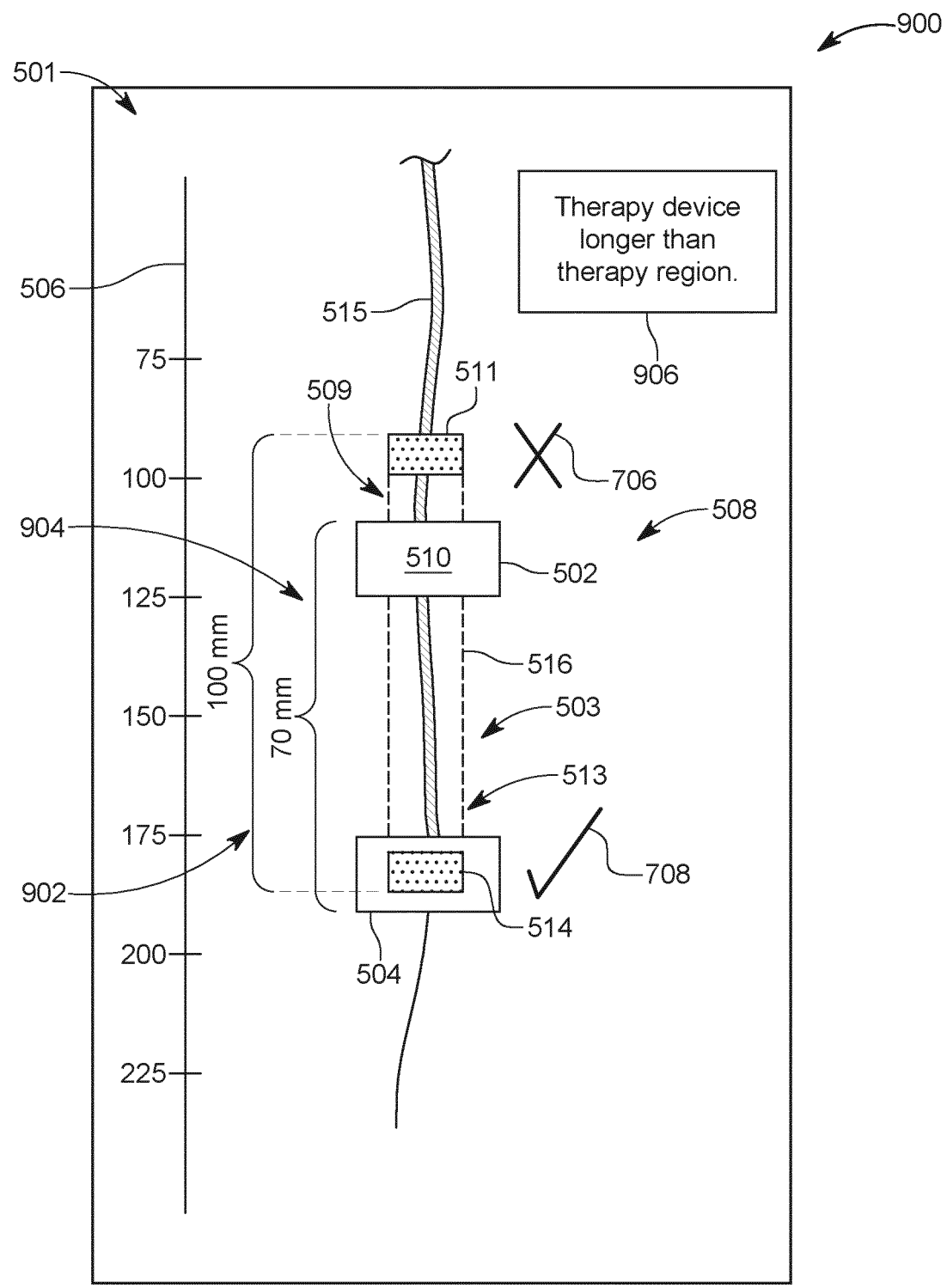
FIG. 9 is a diagrammatic view of a screen display of an x-ray fluoroscopic image stream, without contrast, modified to indicate that a length of an intravascular therapy device is greater than a length of a therapy region of a blood vessel, according to aspects of the present disclosure.

FIG. 9 illustrates a screen display 900 modified to indicate that a length of the therapy device 902 is greater than a length of the therapy region 904. Thus, as illustrated, the screen display 900 may include a graphical representation of the length of the therapy device 902 and/or the length of the therapy region 904, such as a measurement (e.g., text and/or numerals, a bracket or shape, and/or the like). Further, the screen display 900 may include a message box 906 that notifies a user that the therapy device is longer than (e.g., extends beyond) the therapy region 503. In some embodiments, the screen display 900 may additionally or alternatively be modified to include a graphical representation of a difference between the length of the therapy device 902 and the length of the therapy region 904. As an illustrative example, the screen display 900 may include text, numerals, a bracket and/or the like that indicates the 30 mm difference in length between the illustrated therapy region 503 and therapy device 516. For instance, the message box 906 may notify the user the extent by which the therapy device 516 is longer than the therapy region 503.

Figure 10:
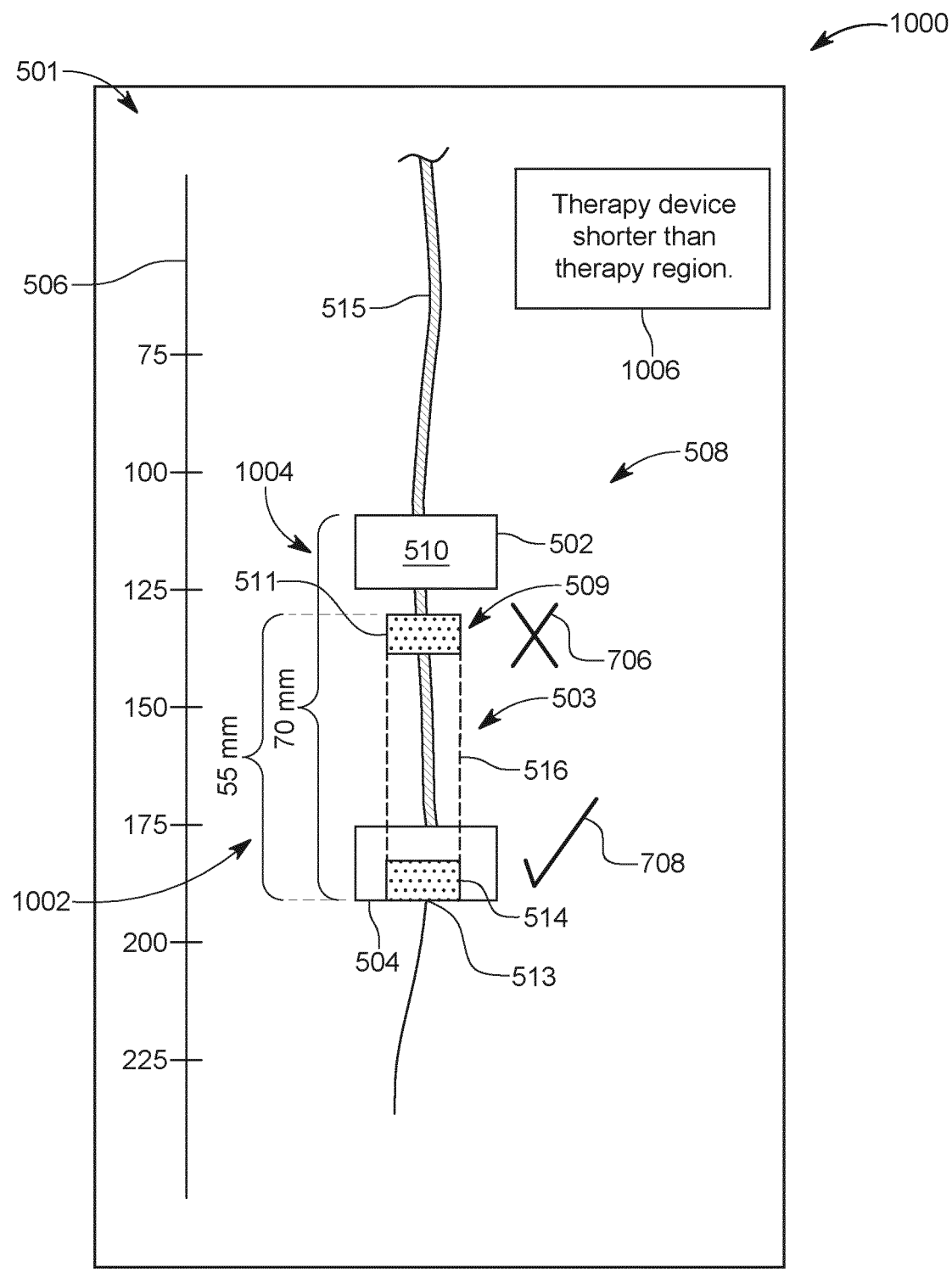
FIG. 10 is a diagrammatic view of a screen display of an x-ray fluoroscopic image stream, without contrast, modified to indicate that a length of an intravascular therapy device is less than a length of a therapy region of a blood vessel, according to aspects of the present disclosure.

FIG. 10 illustrates a screen display 1000 modified to indicate that a length of the therapy device 1002 is smaller than a length of the therapy region 1004. Thus, as illustrated and described above, the screen display 1000 may include a graphical representation of the length of the therapy device 1002 and/or the length of the therapy region 1004. Moreover, the screen display 1000 may include a message box 1006 that notifies a user that the therapy device 516 is shorter than the therapy region 503. In some embodiments, the screen display 1000 may additionally or alternatively be modified to include a graphical representation of a difference between the length of the therapy device 1002 and the length of the therapy region 1004. As an illustrative example, the screen display 1000 may include text, numerals, a bracket and/or the like that indicates the 15 mm difference in length between the illustrated therapy region 503 and therapy device 516. For instance, the message box 1006 may notify the user the extent by which the therapy device 516 is shorter than the therapy region 503.

In some cases, the screen display 900 and/or 1000 may be modified to indicate that another dimension (e.g., a width or a diameter) of the therapy device is greater than or less than the corresponding dimension of the therapy region. For example, the screen display 900 and/or 1000 may be modified to notify the user that a balloon and/or stent of the therapy device is over-inflated or over-expanded (e.g., the width or diameter of the balloon or stent exceeds the width or diameter of the therapy region) during a balloon angioplasty and/or stenting procedure, for example. For example, the screen display 900 and/or 1000 may be modified to notify the user that a balloon or stent of the therapy device is under-inflated or under-expanded (e.g., the width or diameter of the balloon or stent is less than the width or diameter of the therapy region) during a balloon angioplasty and/or stenting procedure, for example.

In some embodiments, the relative difference in length between the therapy device and the therapy region may be readily apparent based on the graphical representation of the length and/or the proximal alignment icon 706 and the distal alignment icon 708 in either screen display 900 of FIG. 9 or screen display 1000 of FIG. 10. For example, as illustrated in FIGS. 9 and a mismatch in length between the length of the therapy device and the therapy region may result in only one end (e.g., the distal or proximal end) of the therapy being able to achieve alignment with a corresponding end (e.g., the distal 504 or proximal end 502, respectively) of the therapy region. In such cases, the proximal alignment icon 706 may have a different visual appearance (e.g., color, shape, and or the like) than the distal alignment icon 708. For instance, the end of the therapy region in alignment with the end of the therapy device may be colored green and/or displayed as a check mark, while the opposite end of the therapy region, which is not aligned with the opposite end of the therapy device may be colored red and/or displayed as an 'x'. Accordingly, the proximal alignment icon 706 and the distal alignment icon 708 may be used to indicate the relative difference in length between the therapy region and the therapy device.

In some embodiments, an indication of the length of the therapy device, such as the graphical representation of the length and/or the message boxes 906 and 1006, may be used to determine whether the therapy device 516 is appropriate for the intravascular therapy or whether a different and/or an additional therapy device should be deployed. To that end, the indication of the length of the therapy device may be used to determine whether deployment of the therapy device 516 will result in treatment of the therapy region 503 from healthy-to-healthy tissue and/or whether the therapy device 516 will extend beyond the therapy region when deployed. In some cases, if the therapy device 516 does not extend through the entire therapy region 503, an additional therapy device 516 may be used in conjunction with the therapy device. For example, two stents may be deployed adjacent to one another within the therapy region 503. In other cases, a different therapy device 516, such as a stent or a balloon with a different length may be deployed. Further, because the original therapy device 516 may be used regardless of its size, the intravascular therapy device may operate according to the armed (e.g., first) operational state when at least a portion of the therapy device is in alignment with the therapy region.

In some embodiments, a screen display (e.g., screen displays 900, 1000) may include a graphical representation of the length of the therapy region 503 before the therapy device is introduced in the patient's blood vessel. For instance, outputting a screen display (e.g., at step 406 of method 400) may involve outputting a graphical representation of the length of the therapy region 503 to guide selection of a therapy device based on a size (e.g., length) of the therapy device. In particular, the screen display may include a graphical representation of a suitable length or range of lengths (e.g., a minimum length and a maximum length) for therapy devices such that a therapy device corresponding to the length or range of lengths, if selected, may be suitable to treat the therapy region 503. That is, for example, the selected therapy device may extend from the proximal end of the therapy region 502 to the distal end of the therapy region 504, if deployed. Accordingly, in some embodiments, the screen display may include a recommended length or range of lengths for the therapy device.

Turning now to FIGS. 11-15, diagrams illustrating the method 400 of FIG. 4 as applied to intravascular therapies such as atherectomy and/or thrombectomy, are provided. For example, FIG. 11 illustrates an x-ray stream 1100 that may be used to determine a therapy region 1101 (e.g., therapy region 503) of a blood vessel for the delivery of intravascular therapy (e.g., step 404 of method 400), such as atherectomy and/or thrombectomy. The x-ray stream may include a visualization of an intravascular device 1103 (e.g., intravascular device 300 of FIG. 3). More specifically, FIG. 11 includes a visualization of a flexible elongate member 1106 (e.g., flexible elongate member 321 of FIG. 3) at a distal portion of the intravascular device 1103, as well as a therapy device 1108 (e.g., active component 324 of FIG. 3), such as an atherectomy device and/or a thrombectomy device, that may be used to deliver the intravascular therapy. As illustrated, the intravascular device 1103 may include and/or interface with a guidewire 1105. In some embodiments, the visualization of the intravascular device 1103 may correspond to the portions of the intravascular device that are radiopaque and, as a result, visible in a fluoroscopic image. In the illustrated embodiment, for example, the therapy device 1108 and the guidewire 1105 are radiopaque and therefore visible. Any suitable portion of the intravascular device and/or the therapy device 1108 may be radiopaque. Further, as described above with reference to FIG. 5, the therapy region 1101 may be determined based on an input, such as an input received via a GUI, and may be made with respect to a reference marker 506. More specifically, this input may correspond to a selection of the therapy region 1101, as illustrated. This selection of the therapy region 1101 may be enabled by circling, clicking, highlighting, coloring, and/or overlaying a shape upon the therapy region 1101 at the GUI via an I/O device, for example.

Moreover, a screen display 1110 including the x-ray stream 1100, a reference marker 506, and a graphical representation of the selected therapy region, such as the highlighted region 1102, may be output for display (e.g., step 406 of method 400).

FIG. 12 illustrates an angiographic image 1200 and/or an angiographic image stream (e.g., x-ray angiographic images), with contrast, that may be used in conjunction with the x-ray stream 1100 to determine the therapy region of the blood vessel (e.g., step 404 of method 400). For example, as described above with reference to FIG. 6, the angiographic image 1200 may be obtained by introducing a contrast agent to the patient's vasculature so that the blood vessel 1202, a narrowed region 1206 (e.g., a stenosis and/or lesion), and/or blood vessels 1204 branching from the blood vessel, are visible in the angiographic image 1200. Accordingly, a physician may identify the location of the narrowed region 1206 relative to the reference marker 506 as a target for delivery of the intravascular therapy. Thus, the physician may subsequently identify the relative location of the narrowed region 1206 with or without the presence of a contrast agent in the patient's vasculature. That is, for example, the input corresponding to the selection of the therapy region 1101 may be determined based on the reference marker 506.

FIG. 13 illustrates a screen display 1300 modified to indicate that the intravascular device 1103, which may include and/or interface with a guidewire 1105, is not positioned to deliver intravascular therapy (e.g., step 410 of method 400). For example, as illustrated, the screen display 1300 may include a dialog box 1304 that represents the operational state of the intravascular device 1103 is not armed (e.g., the second operational state). The screen display 1300 may include a therapy region alignment icon 1306 that represents a state of alignment between the therapy device 1108 (e.g., the active component 324 of FIG. 3) and the therapy region 1101. In some instances, the therapy device is disposed at a tip 1308 of the intravascular device 1103. In such embodiment, the icon 1306 represents a state of alignment between the tip 1308 and the therapy region 1101. In some instances, the therapy device 1108 may disposed at an end or distal portion of the intravascular device 1103, spaced from the tip 1308. In such embodiment, the icon 1306 represents a state of alignment between the end/distal portion and the therapy region 1101

In the case of atherectomy and/or thrombectomy, delivering the intravascular therapy may involve sweeping therapy device 1108 (e.g., the tip 1308 or end/distal portion of the intravascular device 1103) through the therapy region 1101. For example, to remove a stenosis positioned within the therapy region 1101, therapy device 1108 may be operated (e.g., active) throughout the therapy region 1101. However, to avoid damage to healthy tissue, the therapy device 1108 may be disabled and/or disarmed when the therapy device 1108 is outside the therapy region 1101. Accordingly, because the therapy device 1108 is outside the therapy region 1101 in the illustrated embodiment, the therapy region alignment icon 1306, as well as the dialog box 1304, indicates that the intravascular therapy device 1108 is not positioned to deliver therapy.

In some embodiments, the screen display 1300 may be modified to indicate that the intravascular device 1103 is not positioned to deliver intravascular therapy based on the position of any suitable portion of the intravascular device 1103 and/or the therapy device 1108. For example, the dialog box 1304 may indicate that the operational state of the intravascular device 1103 is not armed and/or the therapy region alignment icon 1306 may indicate that the intravascular device 1103 is not positioned to deliver therapy based on the distal tip, the distal portion, a radiopaque marker, and/or the like being spaced from the therapy region 1101 by an amount exceeding a threshold (e.g., 0 mm, 1 mm, 5 mm, and/or the like).

While the therapy region alignment icon 1306 is illustrated with a particular shape and position, it should be appreciated that the therapy region alignment icon 1306 may be displayed in any suitable position on the screen display 1300 and as a different icon, such as a warning or error symbol, or any other suitable shape. For example, in some embodiments, the therapy region alignment icon 1306 may be displayed as a distance measurement between the therapy device 1108 (e.g., the tip 1308 or end/distal portion of the intravascular device 1103) and a proximal end 502 or distal end 504 of the therapy region. Further, in some embodiments, the color of the therapy region alignment icon 1306 may be used to represent a state of alignment between the therapy device and the therapy region 1101. For example, the color of the therapy region alignment icon 1306 may be displayed as red to represent misalignment and may be displayed as green to represent proper alignment.

Further, in some embodiments, the graphical representations of the therapy region 1102 may be modified in the screen display 1300 to represent a state of alignment between the therapy device and the therapy region 1101 in addition to or in the alternative of the therapy region alignment icon 1306. For example, in some embodiments, the graphical representations of the therapy region 1102 may change color and/or shape to represent the state of the alignment. To that end, the graphical representation of the therapy region 1102 (e.g., a highlighted region) may be colored and/or highlighted red to represent improper or misalignment between the therapy device and the therapy region 1101 and may be colored and/or highlighted green to represent proper alignment between the therapy device and the therapy region 1101.

FIG. 14 illustrates a screen display 1400 modified to indicate that the intravascular device 1103 is positioned to deliver intravascular therapy (e.g., step 410 in method 400). In some embodiments, the screen display 1400 is modified to indicate that the intravascular device 1103 is positioned to deliver the intravascular therapy by indicating that an operational state of the intravascular device 1103 is armed and/or that a position of the therapy device 1108 (e.g., the tip 1308 or end/distal portion of the intravascular device 1103) is in alignment with (e.g., is positioned within) the therapy region 1101. For example, as illustrated, the dialog box 1404 indicates that the therapy device is armed, and therapy region alignment icon 1306 indicates that the therapy device 1108 is within the therapy region 1101.

In some embodiments, the screen display 1400 may be modified to indicate that the intravascular device is positioned to deliver intravascular therapy based on the position of any suitable portion of the intravascular device 1103 and/or the therapy device 1108. For example, the dialog box 1404 may indicate that the operational state of the intravascular device 1103 is armed and/or the therapy region alignment icon 1306 may indicate that the intravascular device 1103 is positioned to deliver therapy based on the distal tip, the distal portion, a radiopaque marker, and/or the like being within, adjacent to, or spaced from the therapy region 1101 by an amount less than a threshold (e.g., 0 mm, 1 mm, 5 mm, and/or the like).

Figure 15A:
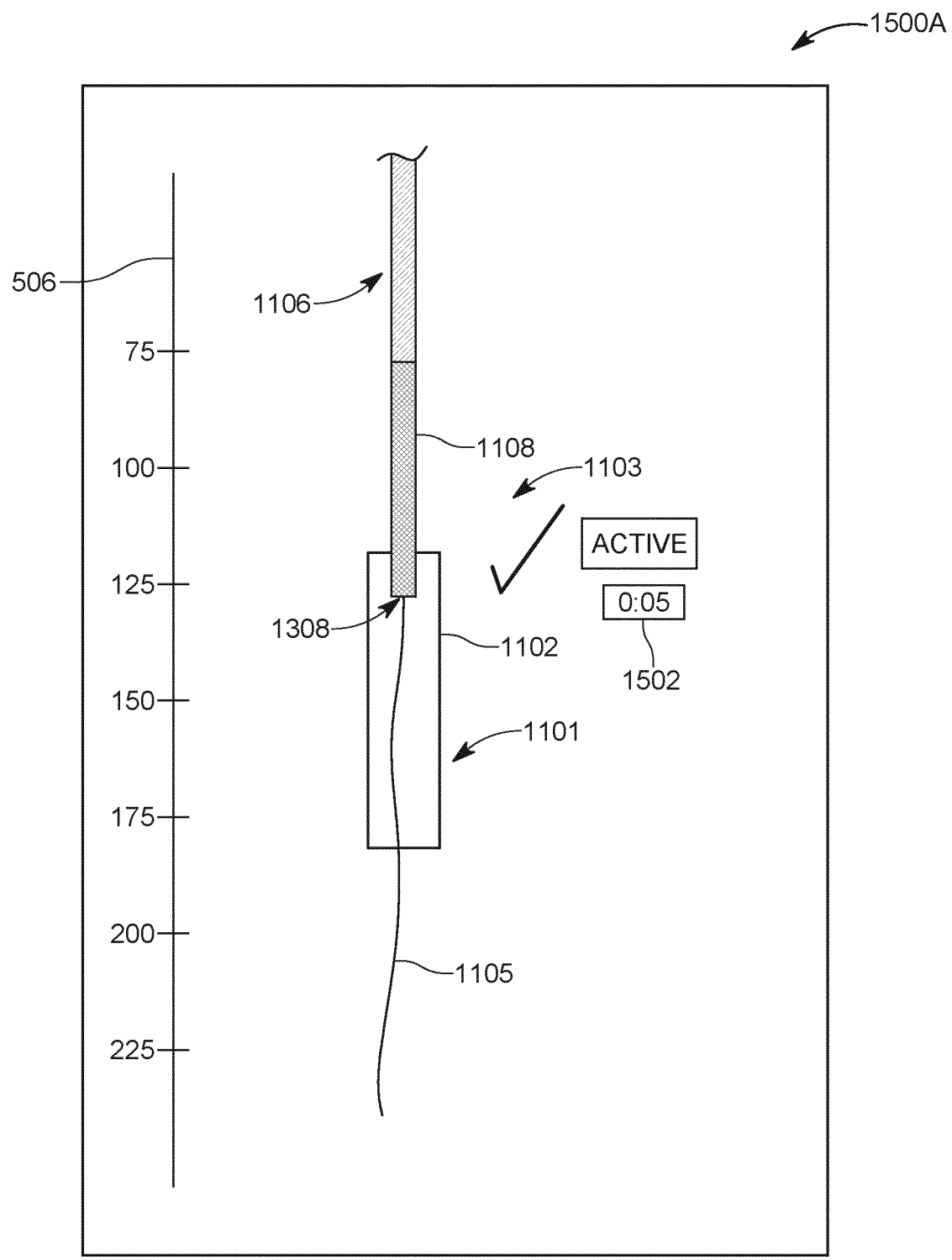
FIG. 15A is a diagrammatic view of a screen display of an x-ray fluoroscopic image stream, without contrast, modified to indicate that an intravascular device has been active within a therapy region of a blood vessel for a first duration, according to aspects of the present disclosure.
Figure 15B:
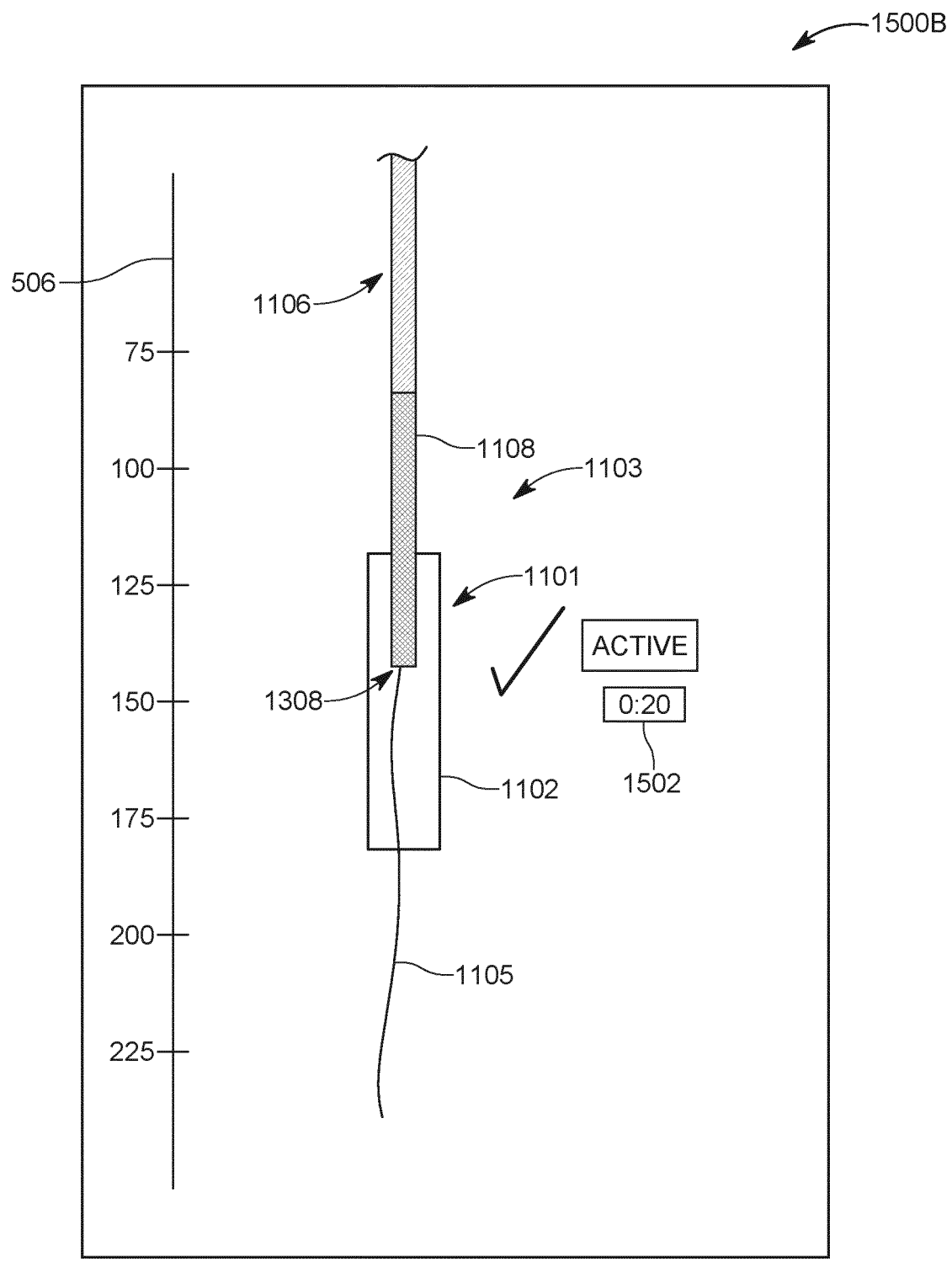
FIG. 15B is a diagrammatic view of a screen display of an x-ray fluoroscopic image stream, without contrast, modified to indicate that an intravascular device has been active within a therapy region of a blood vessel for a second duration, according to aspects of the present disclosure.
Figure 15C:
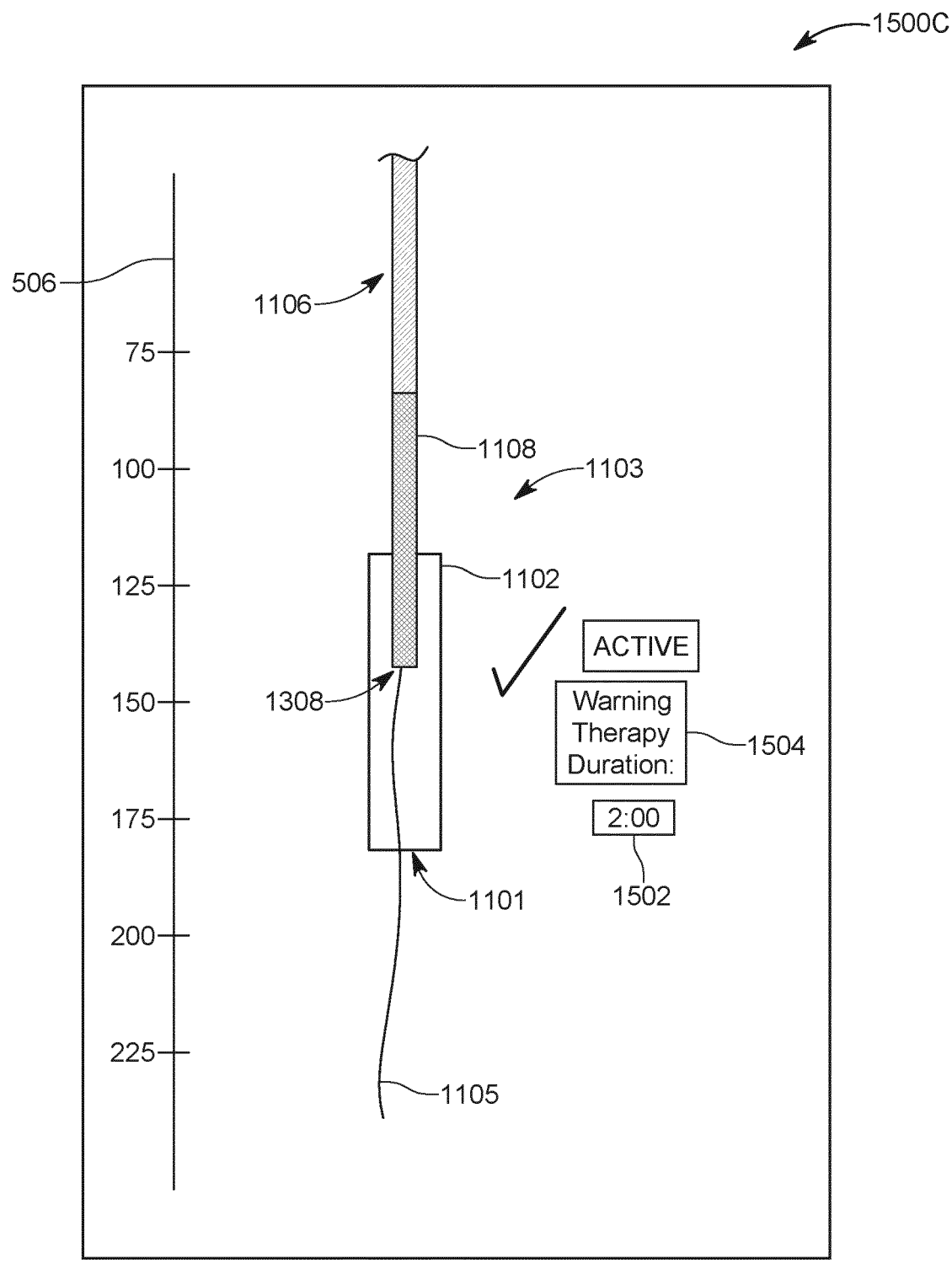
FIG. 15C is a diagrammatic view of a screen display of an x-ray fluoroscopic image stream, without contrast, modified to indicate that an intravascular device has been active within a therapy region of a blood vessel for a third duration, which exceeds a threshold duration, according to aspects of the present disclosure.

FIGS. 15A-C illustrate a set of screen displays 1500A-C modified to indicate a duration the therapy device 1108 (e.g., the tip 1308 or end/distal portion of the intravascular device 1103) has been positioned within the therapy region 1101 and/or a duration of time the therapy device 1108 has been delivering therapy (e.g., active) within the therapy region 1101. For example, each of the screen displays 1500A-C may include a timer 1502 indicating the duration. Accordingly, the screen display 1500A, the screen display 1500B, and the screen display 1500C may correspond to a screen display after the therapy device 1108 has been active within the therapy region 1101 for a first duration (e.g., 5 seconds), a second duration (e.g., 20 seconds), and a third duration (e.g., 2 minutes), respectively. Additionally, the screen display 1500B illustrates movement of the therapy device 1108 from the previous position illustrated in the screen display 1500A, and the screen display 1500C illustrates no movement or relatively small movement of the therapy device 1108 from the position illustrated in the screen display 1500B. Further, in some embodiments, a warning may be provided when the duration exceeds a particular threshold (e.g., 5 seconds, 10 seconds, 30 seconds, 1 minute, 2 minutes, and/or the like) in order to prevent damage to a particular area of the blood vessel. More specifically, the warning may be provided to prevent the therapy device 1108 from delivering therapy (e.g., from being active) in one area for too much time, which may result in damage to healthy tissue. For example, as illustrated in FIG. 15C, the screen display 1500C includes a message box 1504 indicating that the duration the therapy device 1108 has remained in the position illustrated in FIGS. 15B and 15C has exceeded the threshold.

In some embodiments, the duration displayed in a screen display, such as screen displays 1500A-C, may be reset. For example, the duration may reset when the therapy device is disabled and/or disarmed. Accordingly, the duration may reset when the therapy device 1108 (e.g., the tip 1308 or end/distal portion of the intravascular device 1103) is moved outside of the therapy region 1101. Additionally or alternatively, the duration may reset any time the therapy device 1108 moves from being in a stationary position while the therapy device is active (e.g., while therapy is being delivered). In such embodiments, the duration may reset when the therapy device 1108 moves (e.g., rotates and/or translates through the blood vessel), even if the therapy device 1108 remains within the therapy region 1101.

In some embodiments, a screen display (e.g., screen displays 1500A-C) may include a graphical representation of a therapy duration threshold before the therapy device is introduced in the patient's blood vessel. For instance, outputting a screen display (e.g., at step 406 of method 400) may involve outputting a graphical representation the threshold time (e.g., a maximum time) therapy may be delivered within the therapy region 503 and/or to a particular area to guide delivery of the therapy. For instance, the therapy duration threshold may be determined based on the length of the therapy region or another dimension of the therapy region. The therapy duration threshold may be displayed in a message box on the screen display, such as message box 1504. Additionally or alternatively, the timer 1502 may count down from the threshold therapy duration during the delivery of therapy.

It is understood that the data, metrics, features, graphical elements, graphical representations, images, or any other aspects of the screen displays 500, 700, 800, 900, 1000, 1100, 1300, 1400, and/or 1500A-C are merely exemplary and any other additional data, metrics, features, graphical elements, graphical representations, images, or any other aspects are fully contemplated. In addition, the arrangement of the elements listed above is also exemplary. Any suitable configuration, arrangement, or organization is also fully contemplated.

Persons skilled in the art will recognize that the apparatus, systems, and methods described above can be modified in various ways. Accordingly, persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. An intravascular therapy guidance system comprising:
a processor circuit in communication with an extravascular imaging device, wherein the processor circuit is configured to:
receive, from the extravascular imaging device, an extravascular image stream;
determine a therapy region of a blood vessel in the extravascular image stream;
output a screen display to a display in communication with processor circuit, wherein the screen display comprises:
the extravascular image stream of the blood vessel including movement of an intravascular therapy device within the blood vessel to deliver an intravascular therapy to the therapy region; and
a graphical representation of the therapy region overlaid on the extravascular image stream, wherein the graphical representation of the therapy region is distinct from a position of the intravascular therapy device;
determine, based on the extravascular image stream, whether the position of the intravascular therapy device is aligned with the therapy region to deliver the intravascular therapy; and
modify the screen display to indicate the determination of whether the position of the intravascular therapy device is aligned with the therapy region to deliver the intravascular therapy.

2. The system of claim 1, wherein, to modify the screen display, the processor circuit is configured to:
modify the screen display in a first manner in response to determining that the position of the intravascular therapy device is aligned with the therapy region to deliver the intravascular therapy; and
modify the screen display in a different, second manner in response to determining that the position of the intravascular therapy device is not aligned with the therapy region to deliver the intravascular therapy.

3. The system of claim 2,
wherein, to modify the screen display in the first manner, the processor circuit is configured to modify the graphical representation of the therapy region to have a first visual appearance; and
wherein, to modify the screen display in the second manner, the processor circuit is configured to modify the graphical representation of the therapy region to have a different, second visual appearance.

4. The system of claim 2, wherein, to modify the screen display in the first manner, the processor circuit is configured to provide a first indicator in the screen display; and wherein, to modify the screen display in the second manner, the processor circuit is configured to provide a different, second indicator in the screen display.

5. The system of claim 1, wherein, to determine whether the position of the intravascular therapy device is aligned with the therapy region to deliver the intravascular therapy, the processor circuit is configured to:

determine if the intravascular therapy device is within a threshold distance of the therapy region.

6. The system of claim 1, wherein, to determine the therapy region of the blood vessel, the processor circuit is configured to:

receive a user input designating a proximal landing zone for the intravascular therapy device; and receive a user input designating a distal landing zone for the intravascular therapy device.

7. The system of claim 6, wherein, to determine whether the position of the intravascular therapy device is aligned with the therapy region to deliver the intravascular therapy, the processor circuit is configured to:

determine if a proximal portion of the intravascular therapy device is aligned with the proximal landing zone; and determine if a distal portion of the intravascular therapy device is aligned with the distal landing zone.

8. The system of claim 6, wherein the processor circuit is configured to:

determine whether a length of the intravascular therapy device extends a distance between the proximal landing zone and the distal landing zone; and modify the screen display to indicate the determination of whether the length of the intravascular therapy device extends the distance.

9. The system of claim 8, wherein the processor circuit is configured to:

determine the length of the intravascular therapy device;

determine the distance between the proximal landing zone and the distal landing zone; and provide a graphical representation of the length and the distance in the screen display.

10. The system of claim 1, wherein the processor circuit is configured to:

determine, based on the extravascular image stream, an amount of time that the intravascular therapy device delivers the intravascular therapy to the therapy region;

compare the amount of time to a threshold; and provide a graphical representation of the comparison in the screen display.

11. The system of claim 1, wherein the processor circuit is configured to provide a graphical representation of a first state or a different, graphical representation of a second state of the intravascular therapy device in the screen display, wherein, in the first state, the intravascular therapy device is operable to deliver the intravascular therapy; and wherein, in the second state, the intravascular therapy device is not operable to deliver the intravascular therapy.

12. The system of claim 11, wherein the processor circuit is configured to:

provide the graphical representation of the first state of the intravascular therapy device in response to determining that the position of the intravascular therapy device is aligned with the therapy region to deliver the intravascular therapy; and provide the graphical representation of the second state of the intravascular therapy device in response to determining that the position of the intravascular therapy device is not aligned with the therapy region to deliver the intravascular therapy.

13. The system of claim 1, wherein the extravascular imaging device comprises an x-ray imaging device, wherein, to receive the extravascular image stream, the processor circuit is configured to receive an x-ray fluoroscopic image stream obtained without a contrast material inside the blood vessel.

14. The system of claim 13, wherein the processor circuit is configured to determine the therapy region based on an x-ray angiographic image obtained with the contrast material inside the blood vessel.

15. The system of claim 1, further comprising:

the intravascular therapy device.

16. The system of claim 15, wherein the intravascular therapy device comprises at least one of a stent, a balloon, a thrombectomy device, or an atherectomy device.

17. The system of claim 1, wherein, to determine the therapy region, the processor circuit is configured to:

receive a user input designating the therapy region.

18. The system of claim 1, wherein the processor circuit is configured to determine the therapy region based on intravascular ultrasound (IVUS) images of the blood vessel.

19. The system of claim 1, wherein the processor circuit is configured to:

determine a length of the therapy region; and wherein the screen display further comprises a graphical representation of the length of the therapy region.

* * * * *